United States Patent [19]
Enderlein et al.

[11] Patent Number: 5,768,998
[45] Date of Patent: Jun. 23, 1998

[54] SUSPENSION CONVEYOR SYSTEM

[75] Inventors: Robby Enderlein, Landsberg a. Lech; Johann Robu, Olching, both of Germany; Hansjörg Geiger, Schwaz, Austria

[73] Assignee: MTS Modulare Transport Systeme GmbH, Vomp, Austria

[21] Appl. No.: 718,540

[22] PCT Filed: Apr. 11, 1995

[86] PCT No.: PCT/EP95/01323

§ 371 Date: Sep. 30, 1996

§ 102(e) Date: Sep. 30, 1996

[87] PCT Pub. No.: WO95/27669

PCT Pub. Date: Oct. 19, 1995

[30] Foreign Application Priority Data

Apr. 12, 1994 [DE] Germany ............................ 9406060 U
May 24, 1994 [DE] Germany ............................ 9408513 U

[51] Int. Cl.$^6$ ...................................................... B61B 3/00
[52] U.S. Cl. ......................... 104/103; 104/107; 104/111; 104/172.4
[58] Field of Search ................................. 104/93, 94, 96, 104/103, 106, 107, 111, 172.4

[56] References Cited

U.S. PATENT DOCUMENTS

| | | | |
|---|---|---|---|
| 4,471,867 | 9/1984 | Forshee | 104/111 |
| 4,635,558 | 1/1987 | Hoehn | 140/172.4 |
| 4,694,531 | 9/1987 | Foy | 104/111 |
| 5,400,717 | 3/1995 | Hoehn | 104/172.4 |
| 5,598,784 | 2/1997 | Kubsik et al. | 104/172.4 |
| 5,598,785 | 2/1997 | Zaguroli, Jr. | 104/111 |

FOREIGN PATENT DOCUMENTS

| | | |
|---|---|---|
| 666 500 | 11/1965 | Belgium . |
| 2 205 026 | 3/1974 | France . |
| 2 315 461 | 1/1977 | France . |
| 1 440 709 | 6/1976 | United Kingdom . |
| 2 120 617 | 12/1983 | United Kingdom . |

*Primary Examiner*—S. Joseph Morano
*Attorney, Agent, or Firm*—Lyon & Lyon LLP

[57] ABSTRACT

A suspension conveyor system includes a rail network and a roller apparatus adapted to travel along it. The rails comprise at least two sectional running girders each with upper and lower running surfaces and at least one sectional support girder. The running girders extend side by side and are interconnected through strips spaced from each other so as to form a guide slit. The roller apparatus has a carriage comprising two bearing rollers and which is supported by the upper surfaces of the girders. The lower end of the roller apparatus is equipped with a load carrier, arranged below the guide slit. Below the bearing rollers, at least two stabilizing rollers are arranged on either side of the travelling axis of the bearing rollers. The roller apparatus further includes two lateral guide rollers spaced from each other in the travelling direction of the apparatus. The axis of the guide rollers extends perpendicular to the axis of the bearing rollers, and the guide rollers are arranged such that they are guided in the guide slit.

16 Claims, 26 Drawing Sheets

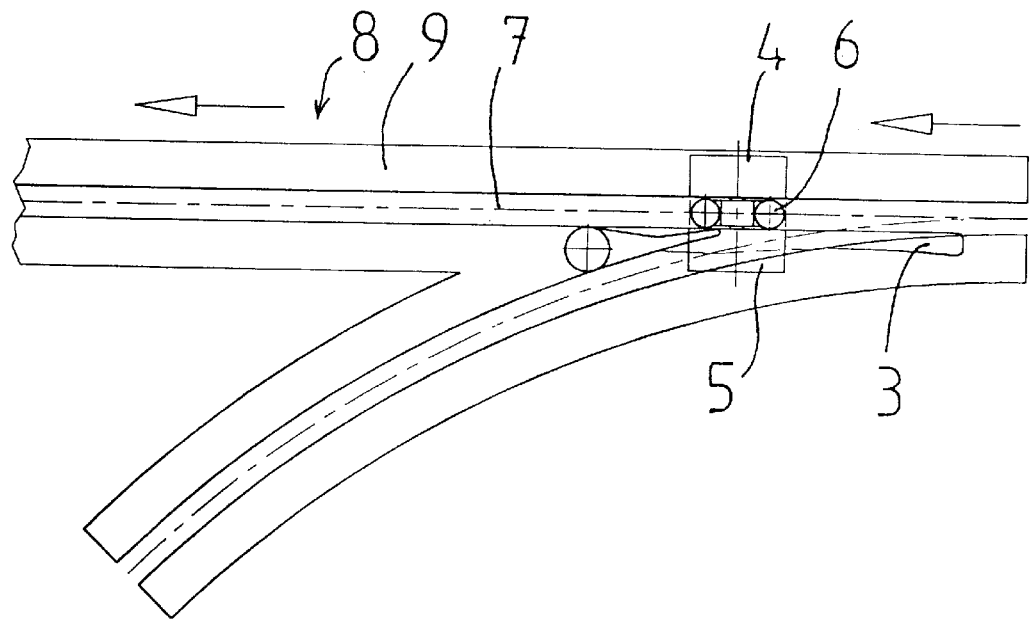
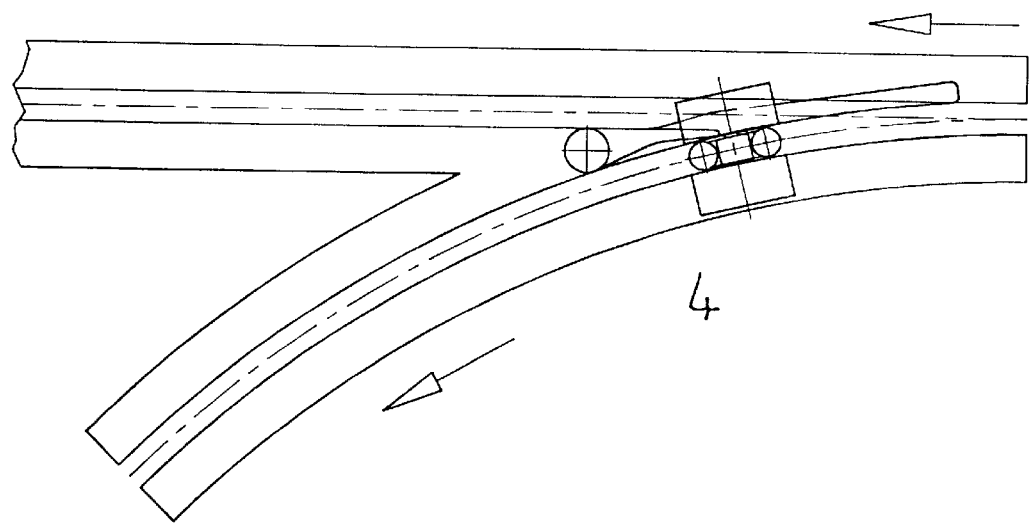
FIG. 3

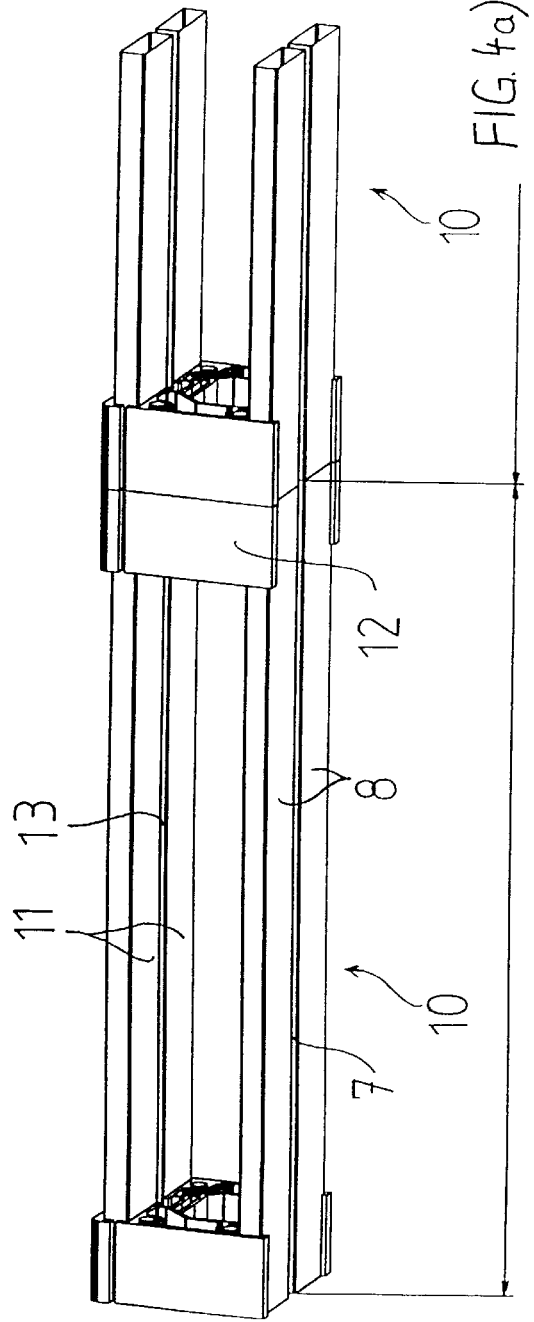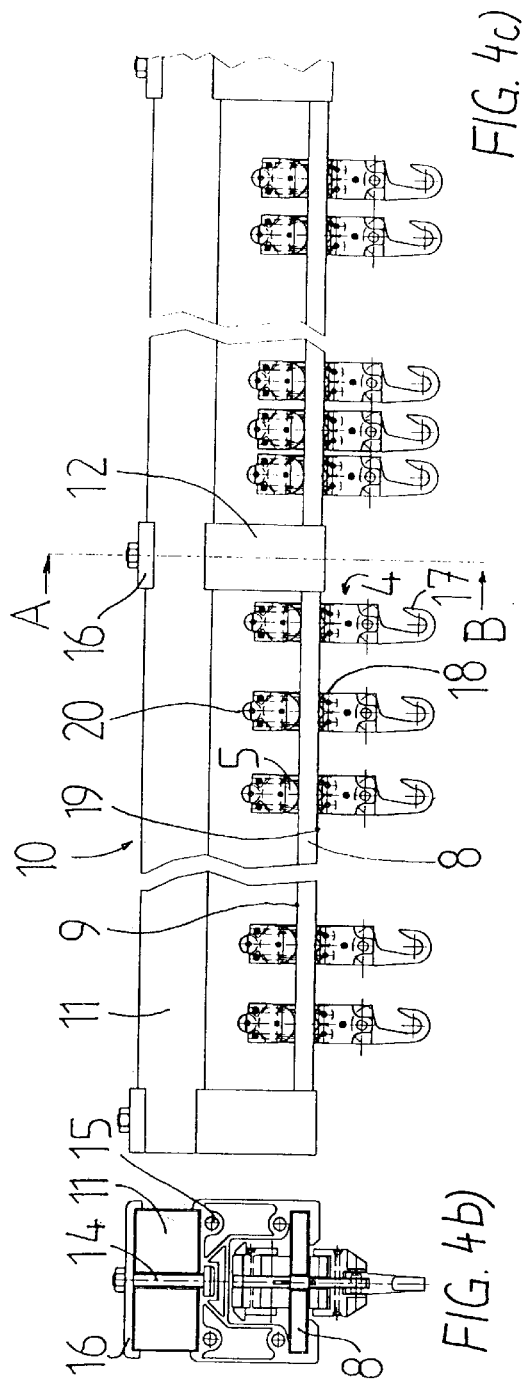

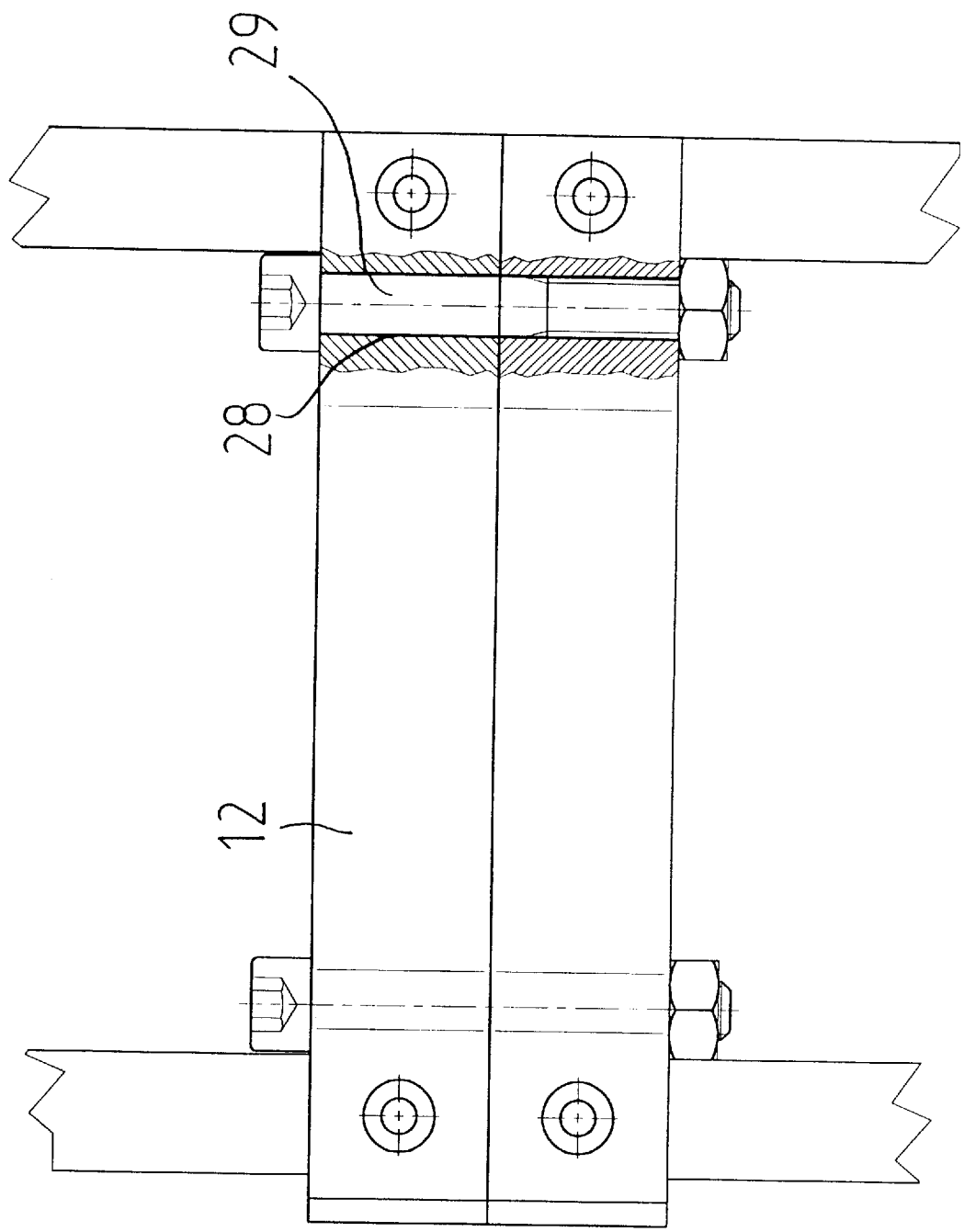

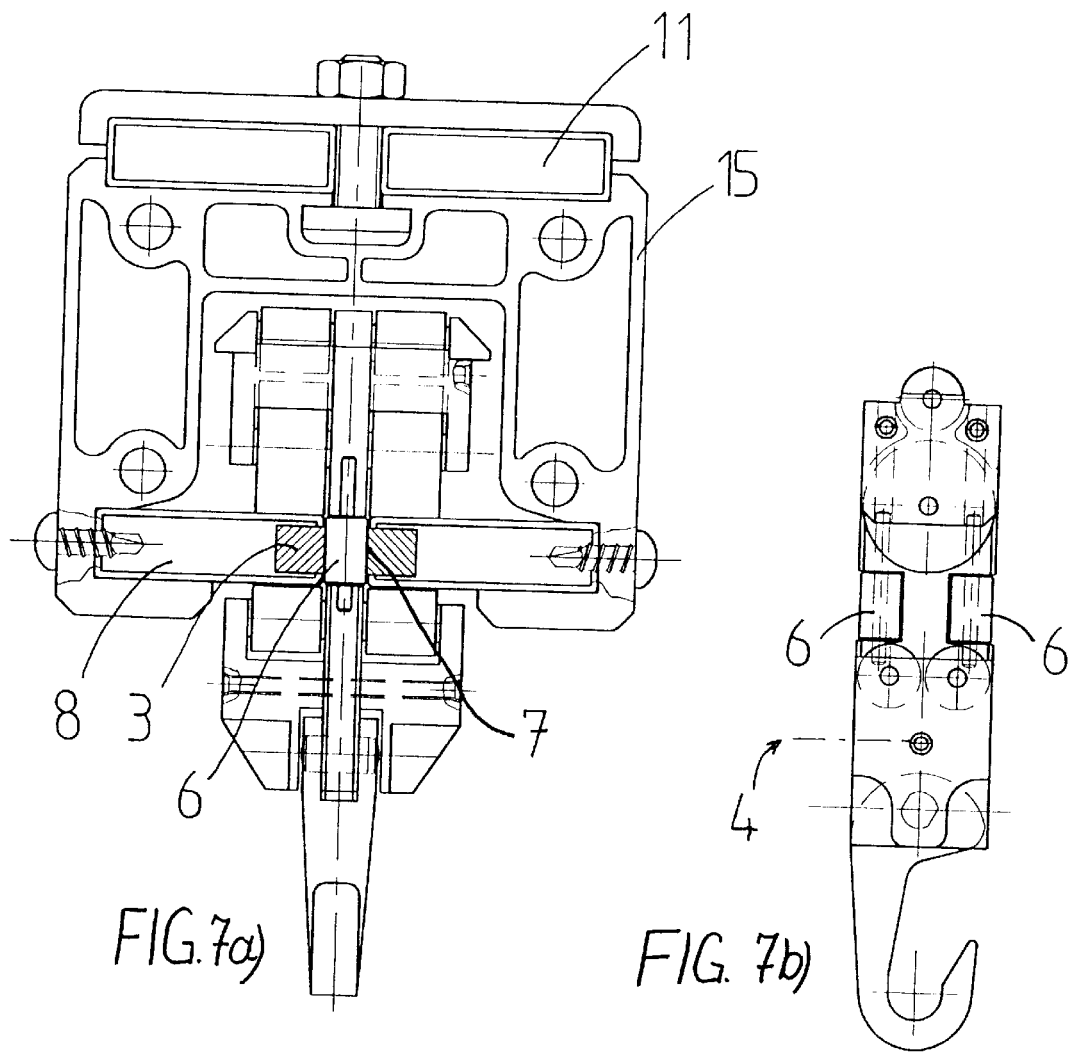
FIG. 7a)
FIG. 7b)
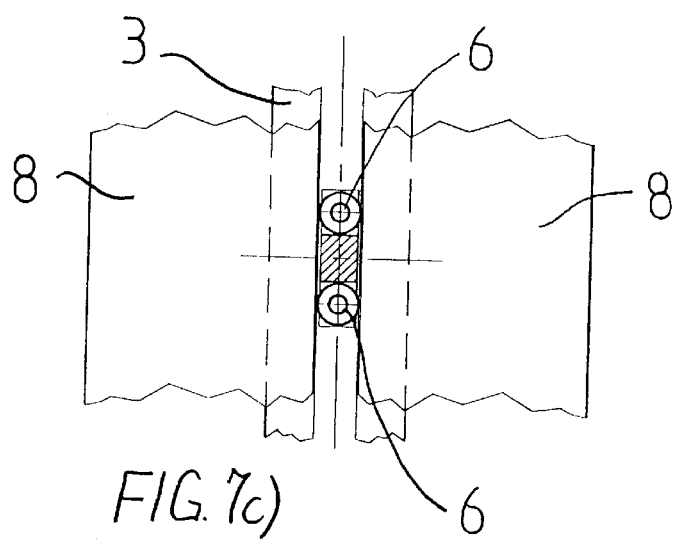
FIG. 7c)

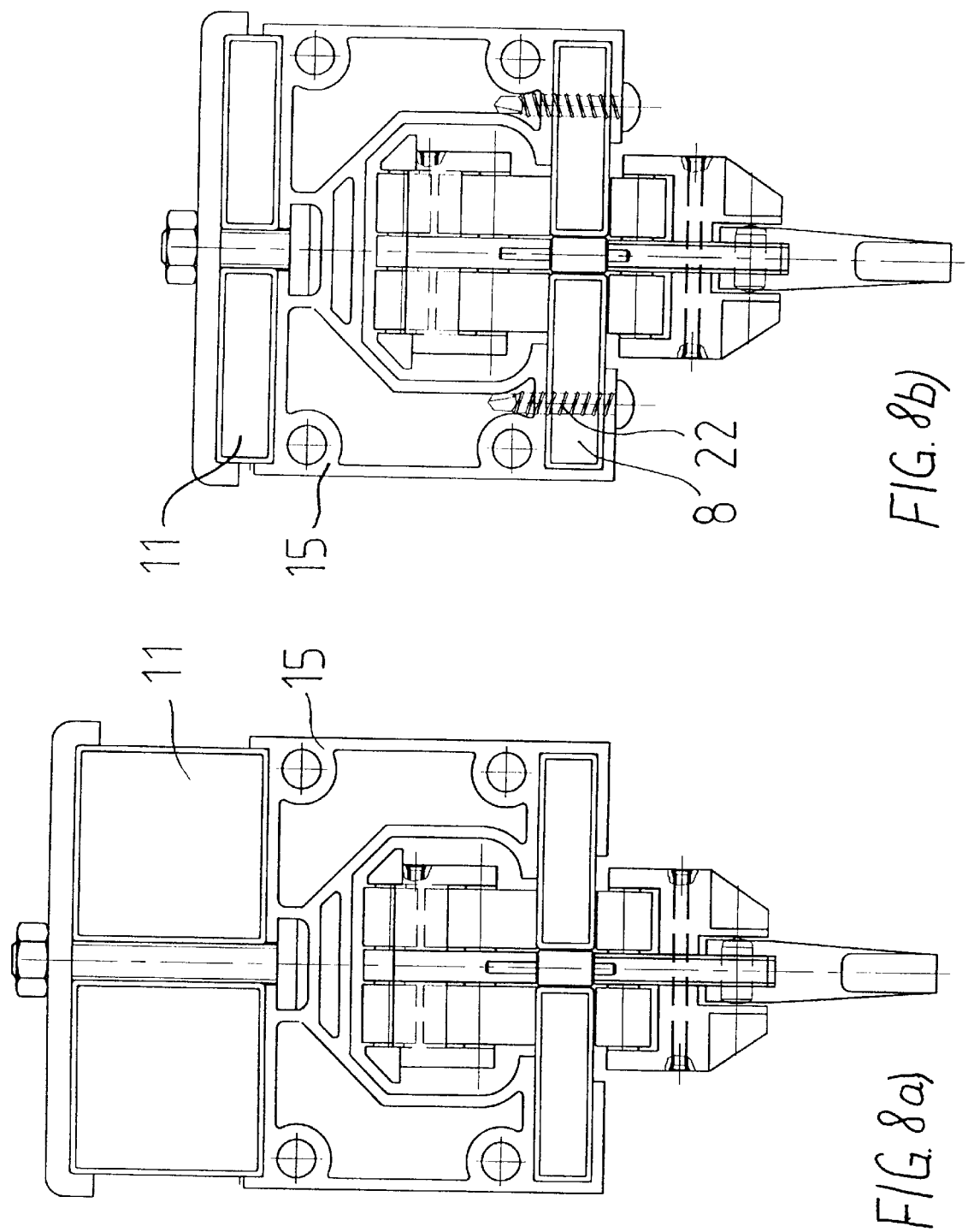

SUSPENSION CONVEYOR SYSTEM

The invention relates to a suspension conveyor system which includes a rail network. The rails of the rail network comprise at least two sectional running girders each with upper and lower running surfaces. The girders extend side by side and are interconnected through strips spaced from each other so as to form a guide slit having a defined width between the two sectional running girders.

A roller apparatus is adapted to travel along the rail network. It has a carriage comprising two bearing rollers, having a common travelling axis, and supported by the upper running surfaces of the girders. The lower end of the roller apparatus is equipped with a load carrier, potentially a load hook, arranged below the guide slit. The roller apparatus has only one travelling axis and includes two lateral guide rollers spaced from each other in the travelling direction of the roller apparatus. The axis of the guide rollers extends perpendicular to the axis of the bearing rollers. The guide rollers are arranged between the bearing rollers and the stabilizing rollers such that they are guided in the guide slit.

Such a suspension conveyor for manual operation is known from GB 2 120 617, for example. This document teaches two rigid self-supporting sectional running rails defining a guide slit therebetween. The rolling apparatus of this suspension conveyor is further provided with lateral guide rollers and a lower stabilizing slide element which may be also arranged in a rotatable manner.

Suspension conveyors comprising a rail network and individual roller apparatuses travelling along the rails have been known for a long time and are used to convey loads of very different sizes; the design of a particular suspension conveyor system may depend to a great extent on the load to be conveyed. In the textile industry, suspension conveyor systems are often employed to convey reels of yarn, sewed clothes or similar work pieces having a relatively low weight. In this context, the suspension conveyor systems are often designed such as to allow both manual operation, i.e. individual roller apparatuses running on the rails and carrying loads suspended therefrom can be pushed by hand, and automatic operation, i.e. driver members convey the respective roller apparatuses automatically.

Special sectional girders have been conventionally used as the rails, the special sectional girders being manufactured by welding individual sectional girders to each other, or by an extrusion process. However, such designs have the drawback that complicated special sectional girders have to be manufactured and, thus, the whole structure cannot be assembled using conventional sectional rails. Moreover, such special sectional girders cannot be sufficiently combined with each other in a modular manner, thus requiring numerous special parts in order to assemble rail systems of arbitrary shape. In addition, the special sectional girders have to be designed relatively large and heavy in order to achieve the desired rigidity of the rail system.

The roller apparatuses known in the prior art can be entrained by a driven conveyor means extending along the running rails and comprising driver members to be coupled to respective roller apparatuses; such a roller apparatus is provided with a carriage having at least one cylindrical bearing roller journalled thereto for rolling on the flat running surfaces of the rail system; and the roller apparatus is further provided with a load-carrying means, in particular a load-carrying hook, at the bottom of the carriage.

The suspension conveyor system may in particular implement an installation for sorting objects suspended from respective load-carrying means where the objects are to be sorted into a predetermined order or arranged into groups having a predetermined order. Such a suspension conveyor and sorting installation, for which roller apparatuses according to the invention are intended, may in particular implement a system for automatically sorting clothes suspended from coat hangers which in turn are suspended from the load-carrying means of the respective roller apparatuses, and for arranging such clothes into groups.

It is an object of the invention to provide a suspension conveyor system of the above-mentioned type allowing the roller apparatus to roll in a stable manner along the rail network even at high velocities and during diversion of the apparatus at switches of the rail network; in addition, guide faces are desired which are engageable by the switches of the rail network without stressing the switches by the conveyed load or the weight of the roller apparatus; and it should be possible to achieve positive driving of the roller apparatus by means of driver members arranged on the driven conveyor means such as a circulating roller chain.

A further object achieved by the invention is to provide a suspension conveyor system of the above-mentioned type in which rail segments having sectional support girders and sectional running girders can be assembled in a modular manner with a great degree of freedom.

According to the invention, these objects are achieved by the following novel features: First, the rails comprise at least one sectional support girder. Second, the sectional running girders have a rectangular cross-section. Third, the sectional running girders extending side by side and the sectional support girder are interconnected through strips spaced from each other. Fourth, below the bearing rollers, at least two stabilizing rollers are arranged at a distance from each other in the travelling direction of the roller apparatus, behind and in front of the travelling axis of the bearing rollers, respectively. The stabilizing rollers are arranged to engage from below the lower running surfaces of the sectional running girders. The axis of the stabilizing rollers extends parallel to the axis of the bearing rollers. Fifth, the roller apparatus is conveyed automatically by means of a driver member engaging the roller apparatus. Sixth, switches are provided to direct the roller apparatus to straight forward travel, a diversion to the left or a diversion to the right, depending on the switch position, and the lateral guide rollers are disposed between the bearing rollers and the stabilizing rollers such as to cooperate with the switches.

Owing to these features, the rail network can be assembled with a great degree of freedom substantially from conventional rails having a rectangular cross-section using relatively light and small strip parts which allow a flexible interconnection of individual rail portions and can be easily displaced. The distance between the sectional running girders and the at least one sectional support girder helps to realise a relatively high rigidity of the rail network.

The stabilizing rollers arranged to roll on the lower surfaces of the running rails prevent the roller apparatus and, thus, the object carried by the roller apparatus from swinging in the travelling direction of the roller apparatus even if the roller apparatus has only one bearing roller or two juxtaposed bearing rollers on a common axis, as is preferred in order to achieve a compact structure of the roller apparatus. In this arrangement, the diameter of the stabilizing rollers may be smaller than that of the bearing rollers since the stabilizing rollers are not stressed by the weight of the roller apparatus and the load suspended therefrom.

At the same time, the two vertically arranged lateral guide rollers prevent the roller apparatus from inadvertently turning out of its direction of travel. In addition, the lateral guide rollers are particularly suitable as guide elements to be engaged by controllable switch blades without stressing the switch blades by the weight of the roller apparatus and the conveyed load, because the switch blades engaging the lateral guide rollers have to receive only lateral guiding forces. The lateral guide rollers may also have a relatively small diameter as they have to receive only the lateral guiding forces while not participating in carrying the weight of the roller apparatus and the load.

When at least one drive-receiving projection is arranged on the exterior of the roller apparatus, the driver members arranged on the driven conveyor means can positively engage the roller apparatus, and the roller apparatus can be easily coupled to, and uncoupled from, the driver members. This is essential for stopping the roller apparatus in the rail network without stopping the conveyor means, or for setting the roller apparatus in motion while the conveyor means keeps running. The coupling facility is in particular achieved by the stabilizing rollers maintaining the position of the roller apparatus as regards its swinging about the running axis; hence, a force may be exerted on the roller apparatus in its direction of travel without pivoting the roller apparatus about the axis of the bearing roller. For instance, such a force occurs when a driver member abuts onto the roller apparatus.

The roller apparatus may be advantageously arranged to be symmetric with respect to the vertical plane including the axes of the lateral guide rollers. Further, the mounting strips may be advantageously implemented as parts of bridges which are sectional structures manufactured by injection moulding, extrusion or in the form of punched and bent pieces of metal sheet. These bridges so formed have a relatively short length in the travelling direction in relation to the overall length of the respective rail segment, thus minimising the use of special sectional profiles the manufacture of which is relatively complicated.

According to the invention, there are provided switch blades capable of engaging the lateral guide rollers in the guide slit, thus directing the roller apparatus straight forward or diverting it to the left or to the right, depending on the switch position. Alternatively, the lateral guide rollers may be formed as rigid elements acting as guiding slides, resulting, however, in an increased overall friction of the system, which may pose a problem in particular when a lot of roller apparatuses are conveyed concurrently one behind the other. Therefore, the lateral guide rollers are preferably rotatable.

According to another preferred embodiment, the switch blades arranged in parallel to each other are disposed on both sides of the guide slit and accommodated in the respective sectional running girders. Generally, it is also possible to accommodate the switch blades at places other than the sectional running girders. For example, the lateral guide rollers could be extended upwardly and the switches could be arranged above the sectional running girders. On the other hand, switch blades comprised within the sectional running girders constitute a particularly compact construction providing optimum protection for the switch mechanism and operating very reliably because the switch blades can engage the lateral guide rollers directly within the guide slit. As at least one lateral guide roller is arranged on the roller apparatus and engaged by the switch blade within the guide slit, the switch blade has to receive only the lateral guiding forces and is not stressed by the weight of the roller apparatus and load suspended therefrom.

The sectional support girders are preferably implemented by tubes of square or rectangular cross-section, with the exterior faces of said tubes oriented horizontally and vertically, respectively. Alternatively, the sectional support girders may comprise different forms, for example, tubes of circular cross-section or girders having a full solid cross-section.

According to the invention, driver members are provided for automatically conveying the roller apparatuses, and the driver members may circulate through the sectional structure. Alternatively, it is possible to design the rails and, thus, the associated sectional structures such that the suspension conveyor system is only suitable for manual operation in which the roller apparatuses are pushed by hand.

The rail network is preferably designed in a modular manner substantially comprising rail segments of the following types: arcuate segment, straight segment, 2-way switch straight/45° to the left, 2-way switch straight/45° to the right, 2-way switch 45° to the right/45° to the left, 3-way switch straight/45° to the right/45° to the left, and intersection switch. Combining of these segments already allows assembly of an arbitrary rail network while requiring only the small number of the aforementioned types of rail segments.

Each of the switches preferably comprises a respective switch tongue to which the associated switch blade or blades, respectively, are hinged in a pivotable manner. In this arrangement, in particular the 2-way switch straight/45° to the left and the 2-way switch straight/45° to the right are designed axially symmetric to each other and the switch tongue is arranged such that by adequate inversion of the tongue, a 2-way switch straight/45° to the left or selectively a 2-way switch straight/45° to the right may be formed. In addition, a manual lever might have to be rearranged. Generally, however, a conversion can be performed at considerably lower costs than by substituting a complete switch of a first type for a complete switch of a second type.

According to a particularly advantageous embodiment, the load-carrying means is a load hook pivotably hinged to the carriage of the roller apparatus. The fact that the hook is pivotable provides an additional stabilizing effect-in addition to the stabilizing effect by the stabilizing rollers-in that a force applied to the load suspended from the load hook in the travelling direction of the roller apparatus results in the hook pivoting and thus yielding. In this way, the leverage between the point where the force engages the roller apparatus, i.e. the pivoting axis of the load hook, and the running axis of the roller apparatus is reduced and, thus, the torque about the running axis is decreased, which provides further stabilization to the roller apparatus.

Advantageously, the axes of the bearing rollers are integral with each other, and the axes of the stabilizing rollers are integral with each other, both types of axes being supported at three points of the carriage of the roller apparatus. The continuous axes increase the rigidity of the carriage. Also advantageously, the bearing rollers and the stabilizing rollers are arranged completely within the outline of the carriage.

According to another advantageous embodiment of the invention, the distance between the axes of the lateral guide rollers is greater than the distance between the axes of the stabilizing rollers. This feature allows optimum running stability to be achieved while maintaining a compact structure of the roller apparatus.

In the following, the invention will be described with reference to preferred exemplary embodiments in conjunction with the drawing figures wherein FIG. 1 is a schematic plan view of part of a rail network;

FIG. 3 depicts a 2-way switch straight/45° to the left in various switch positions along with a schematic representation of a roller apparatus;

Figure 5A:
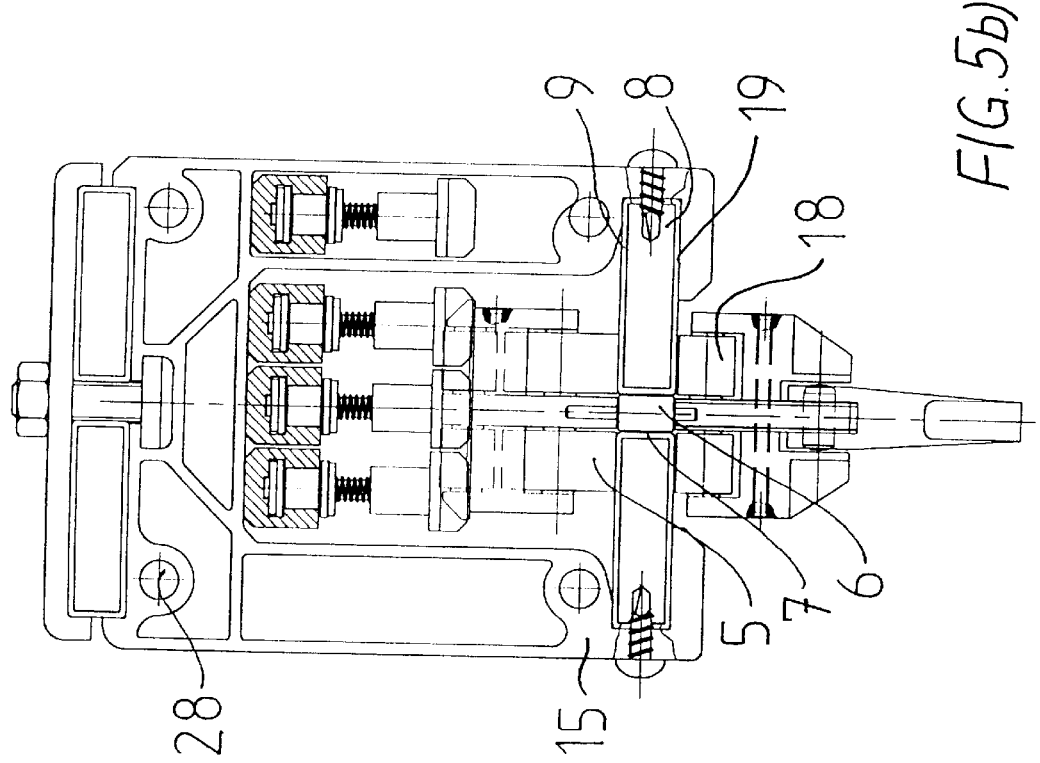
Figure 9:
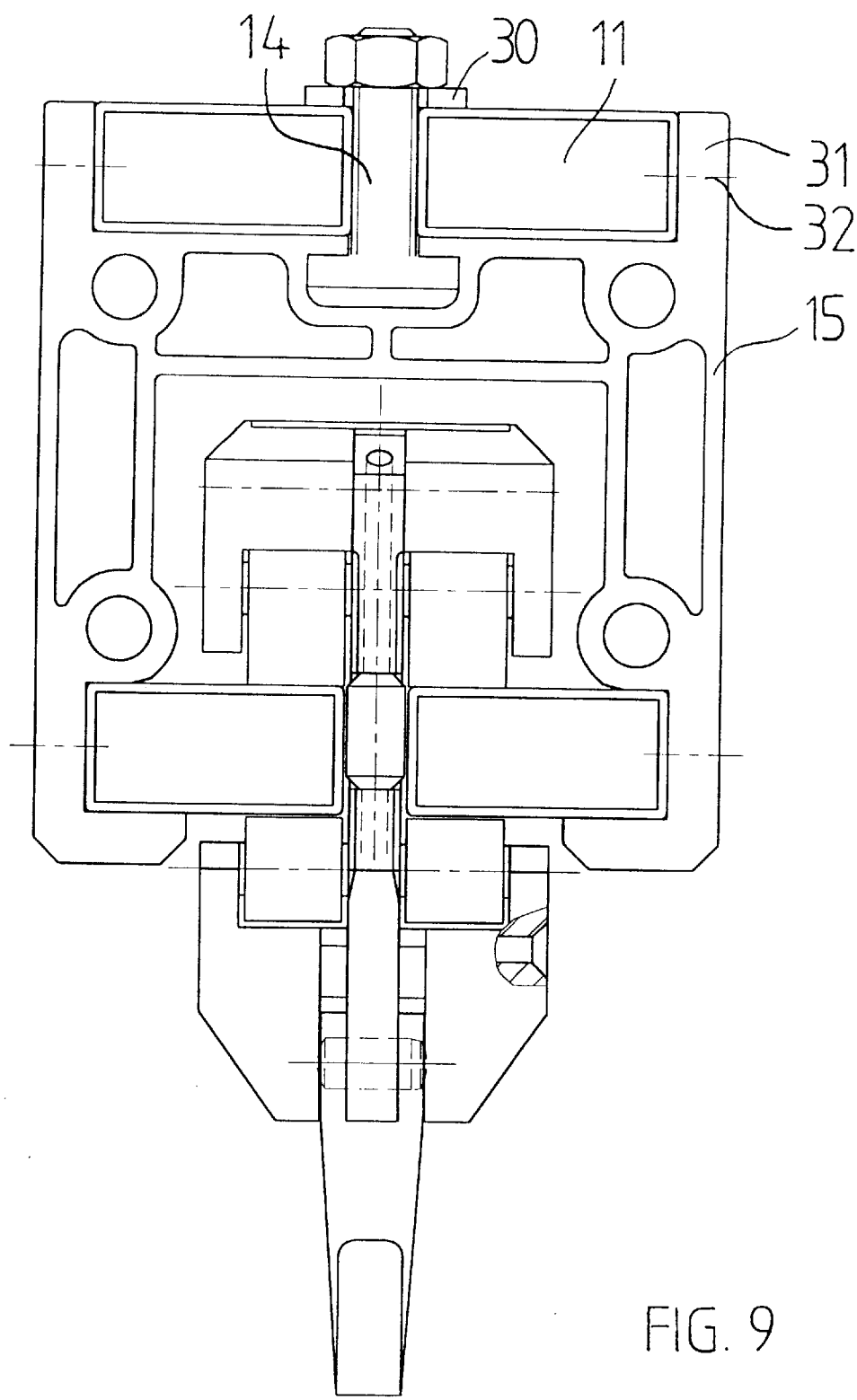
Figure 10:
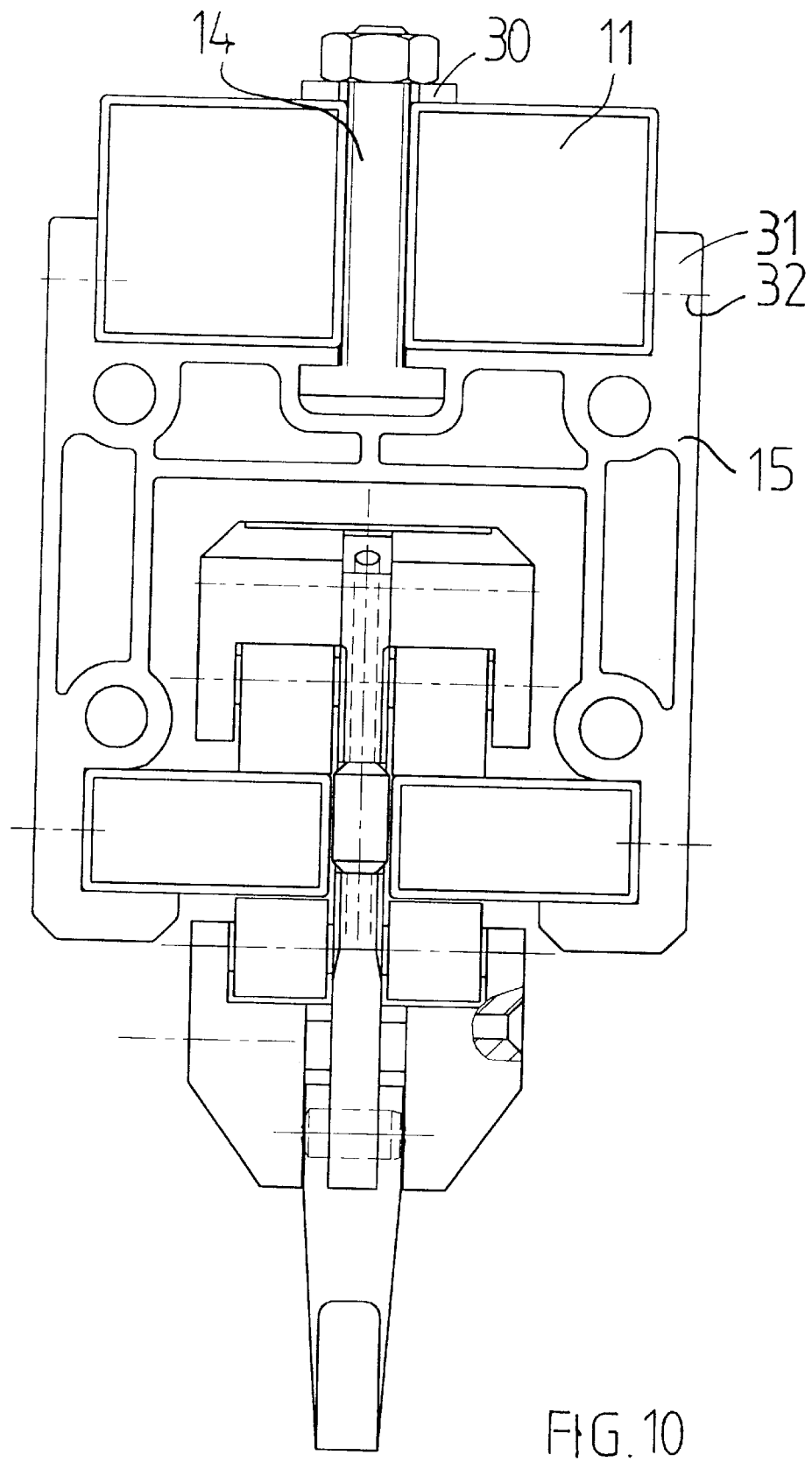
Figure 11:
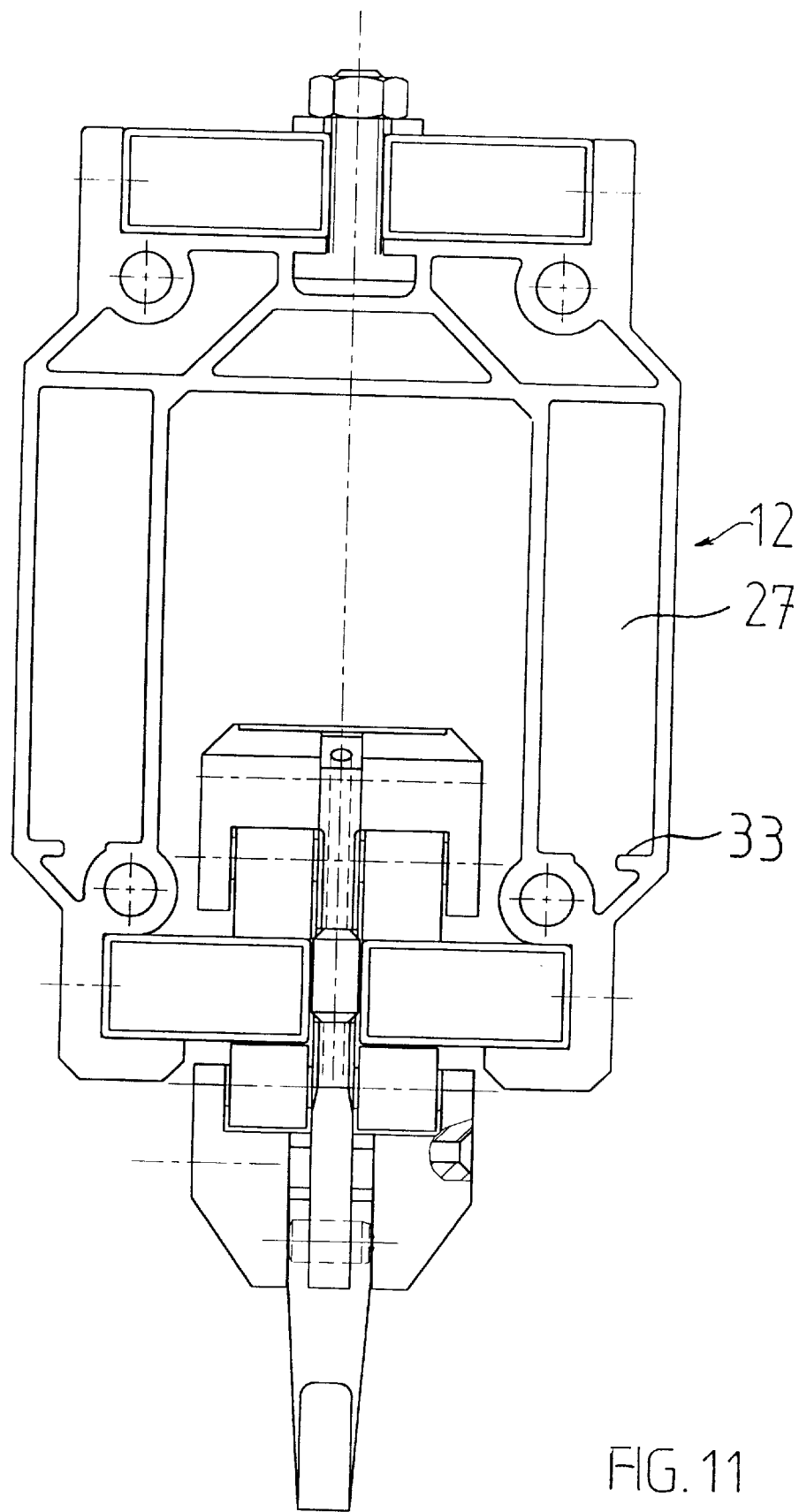
Figure 12:
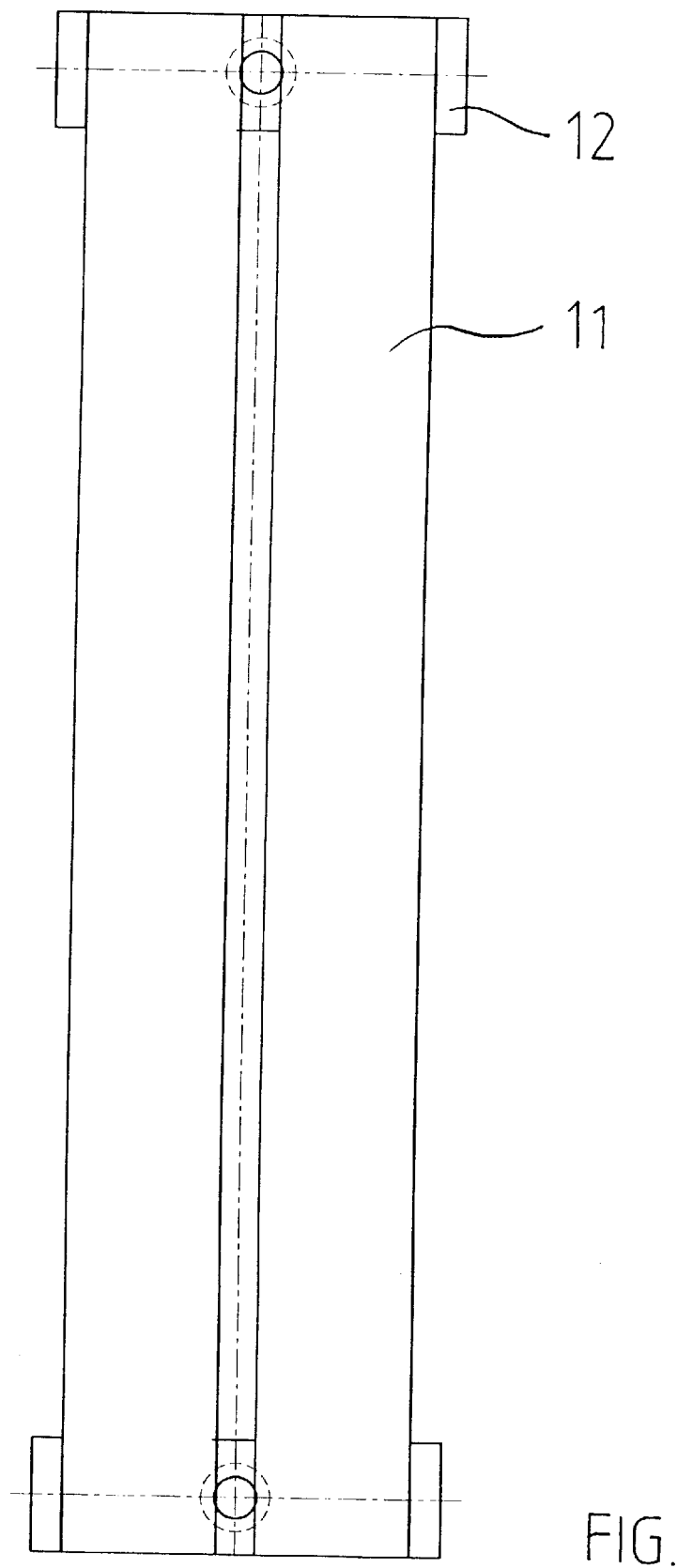
Figure 13:
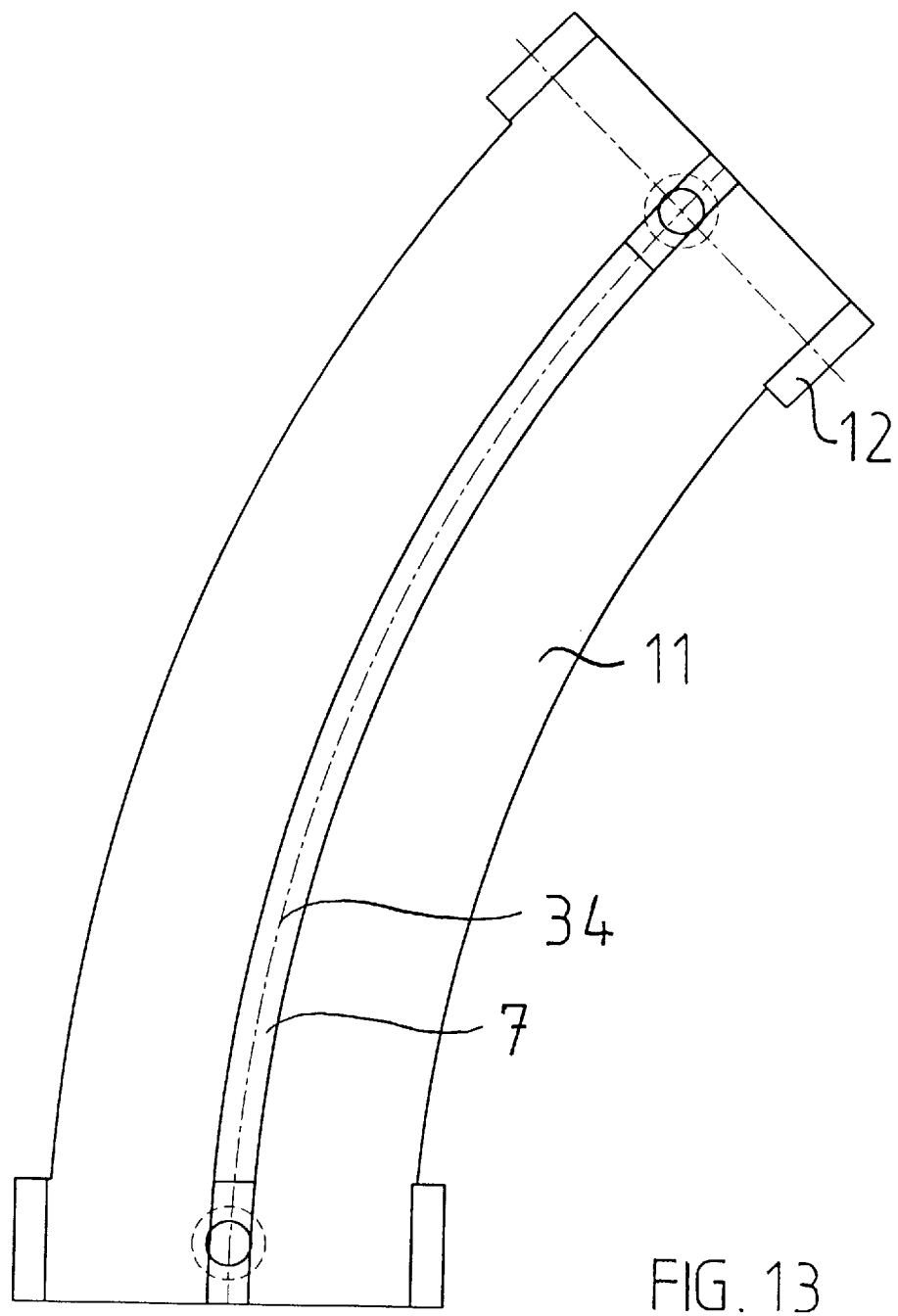
Figure 14:
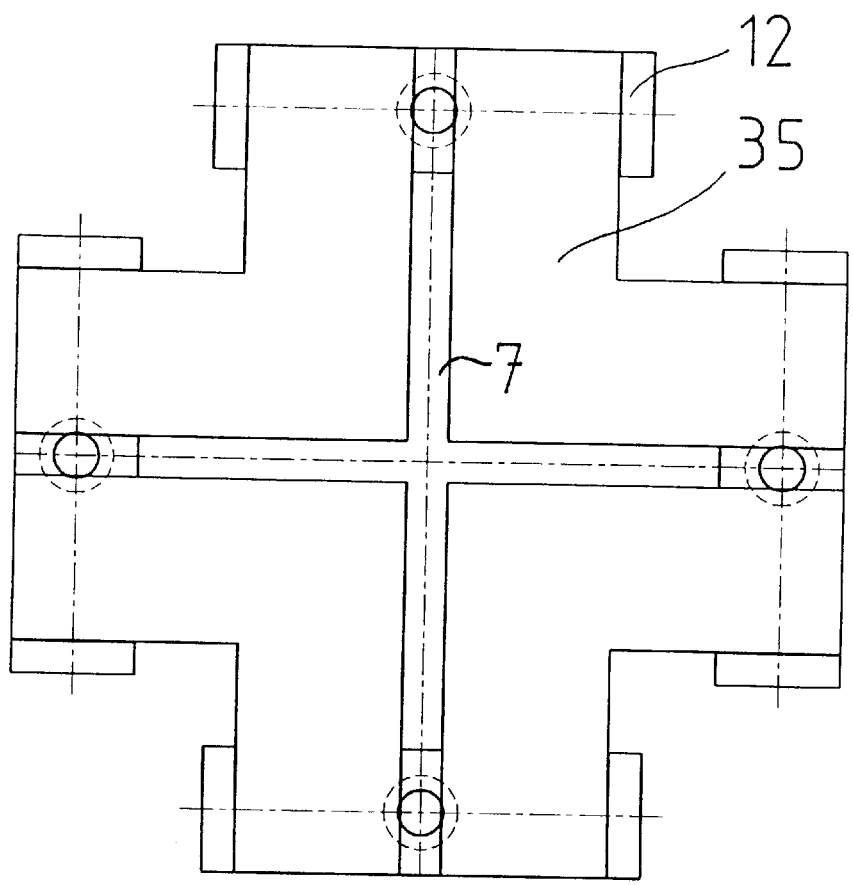
Figure 15:
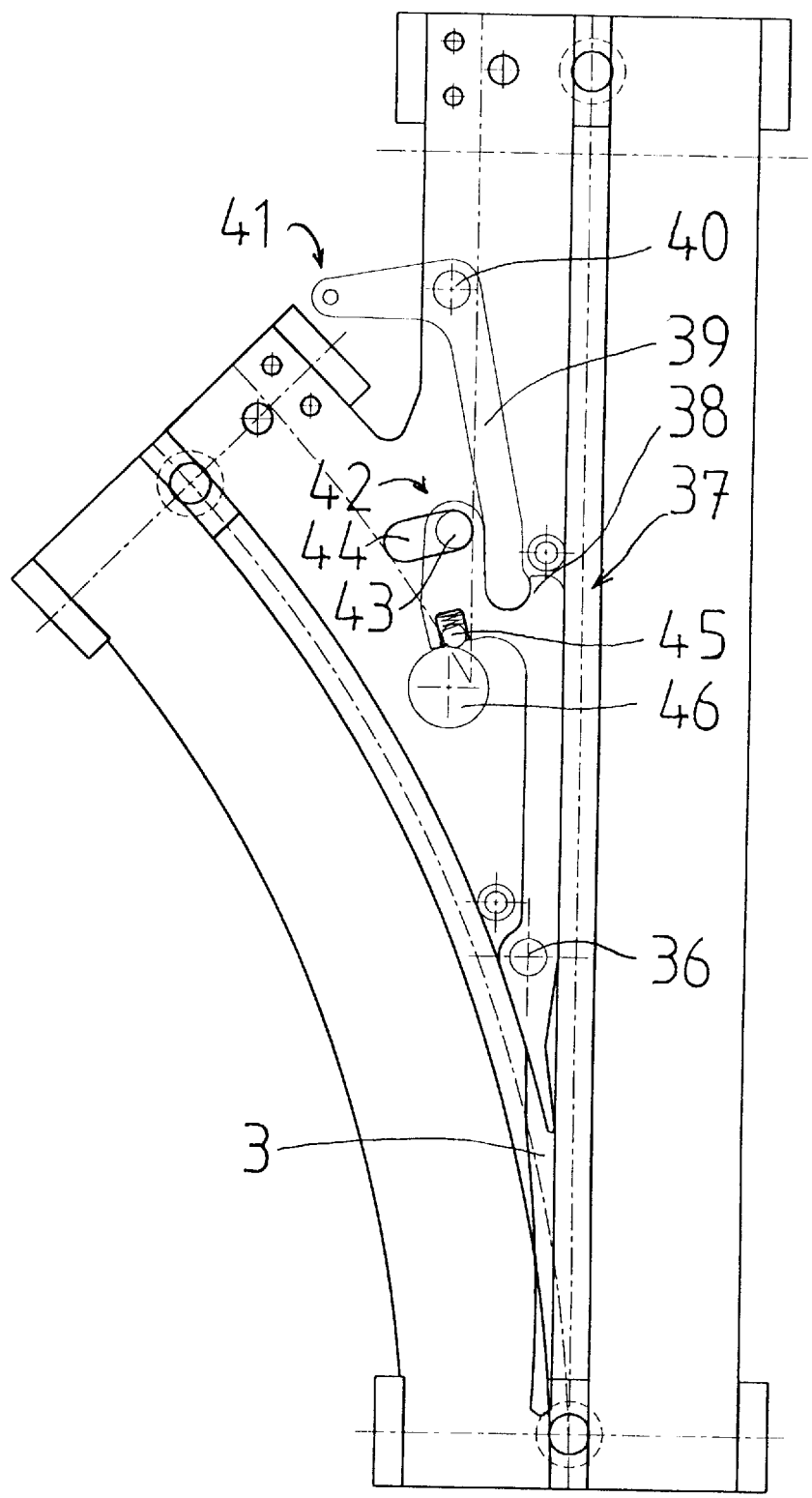
Figure 16:
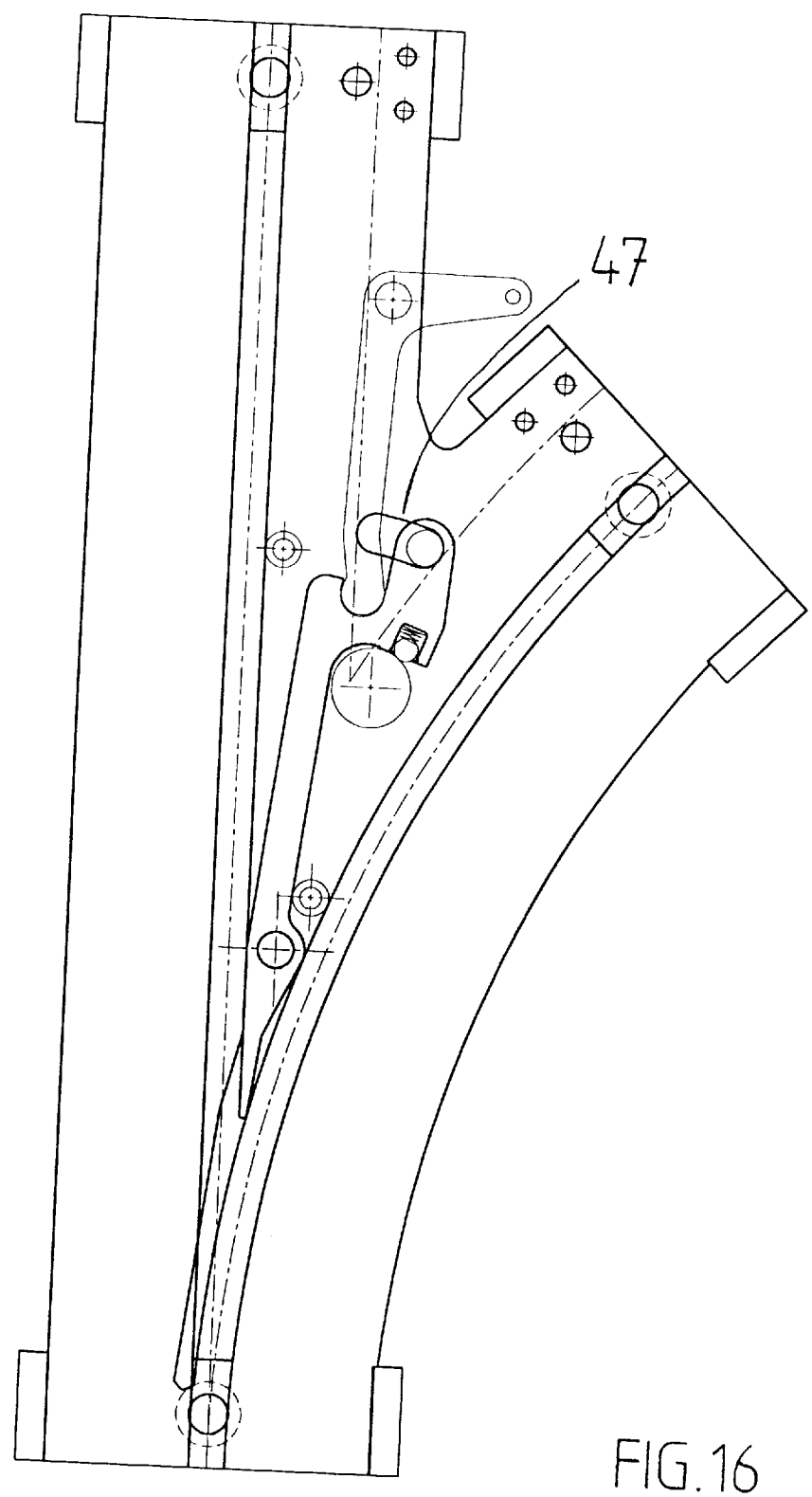
Figure 17:
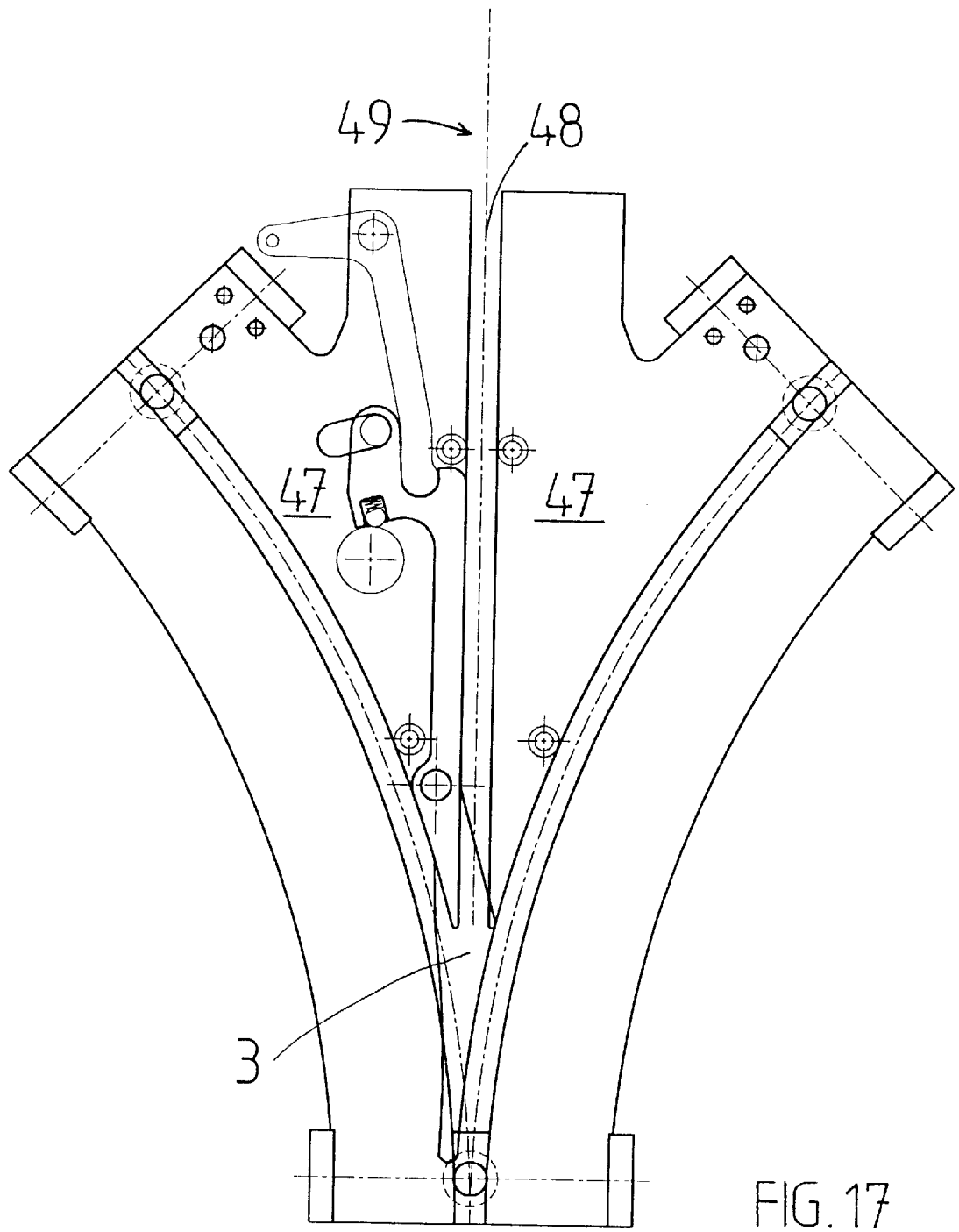
Figure 18:
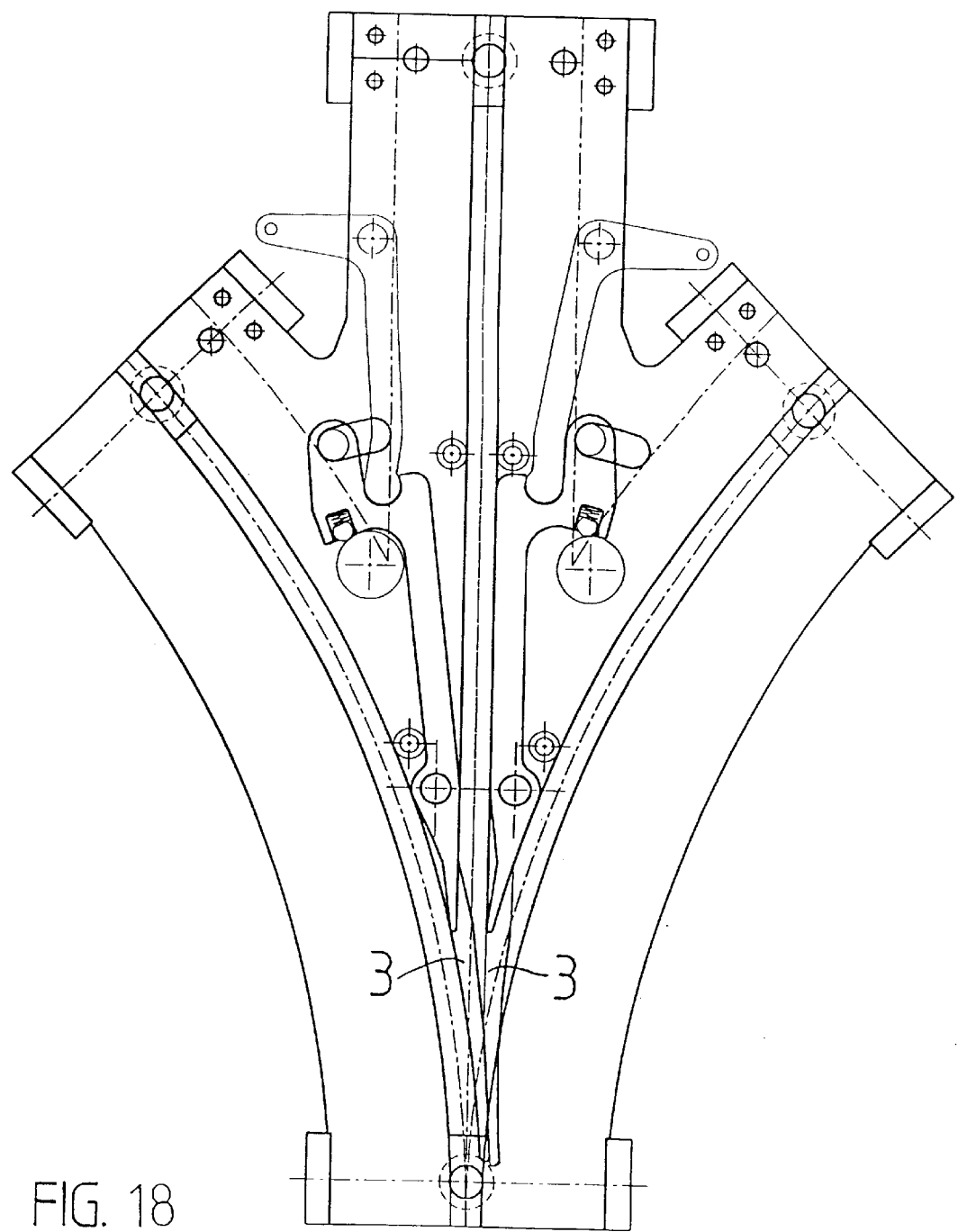
Figure 19A:
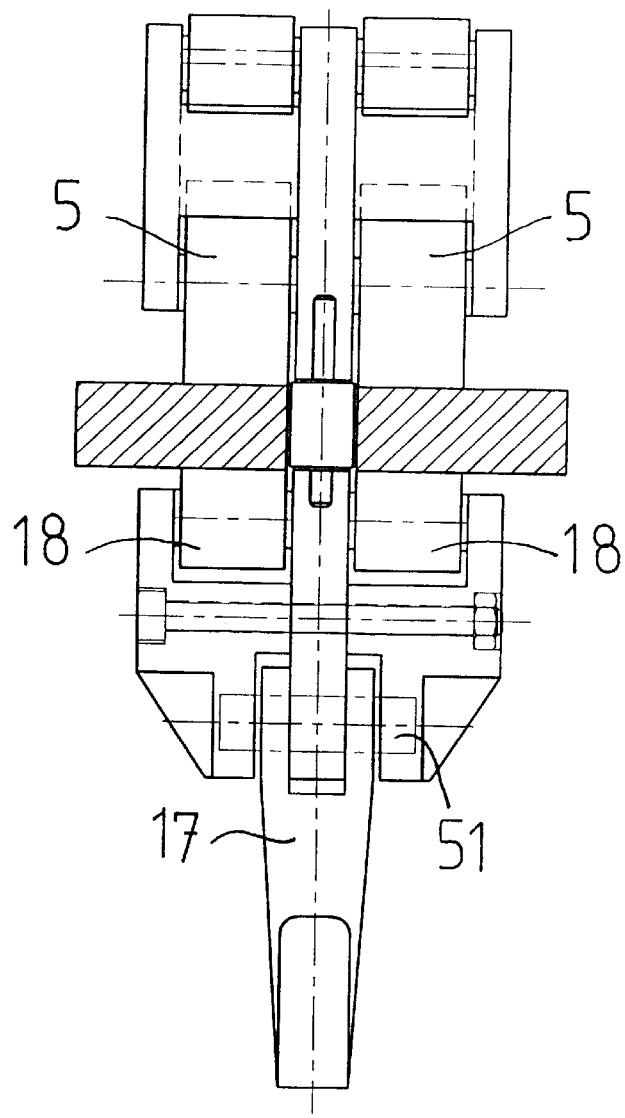
Figure 20A:
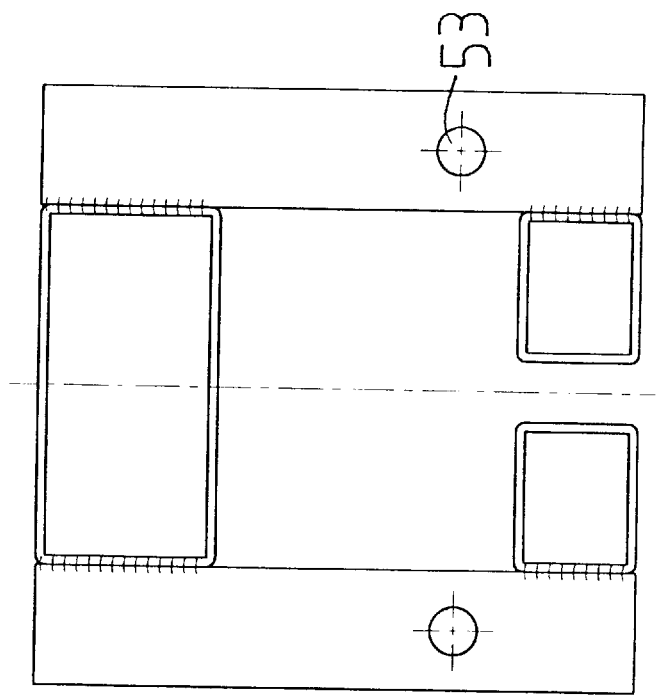
Figure 21B:
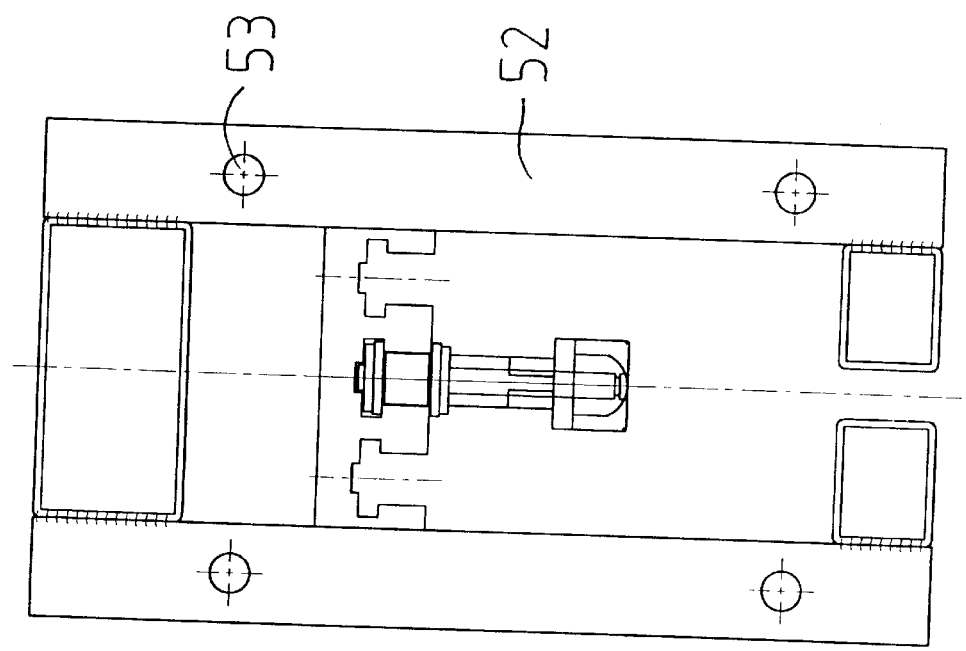
Figure 21A:
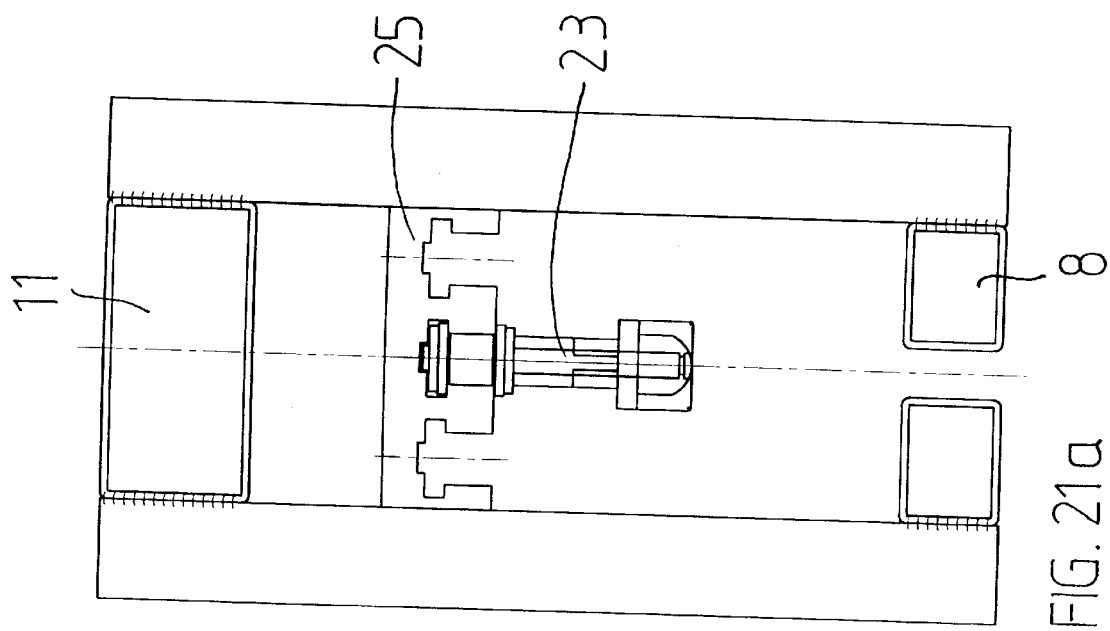
Figure 22B:
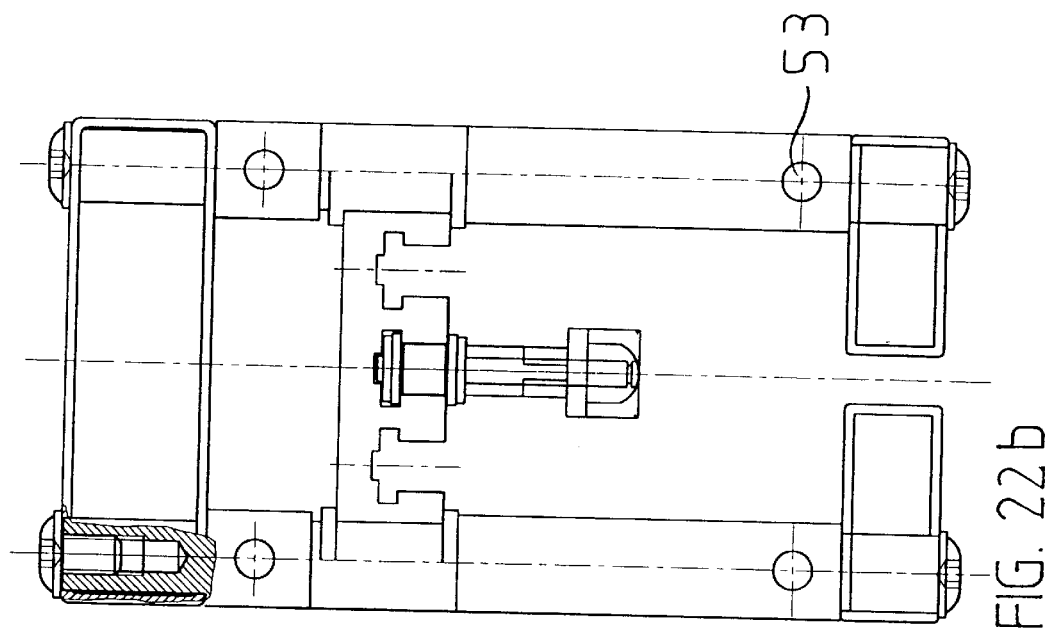
Figure 22A:
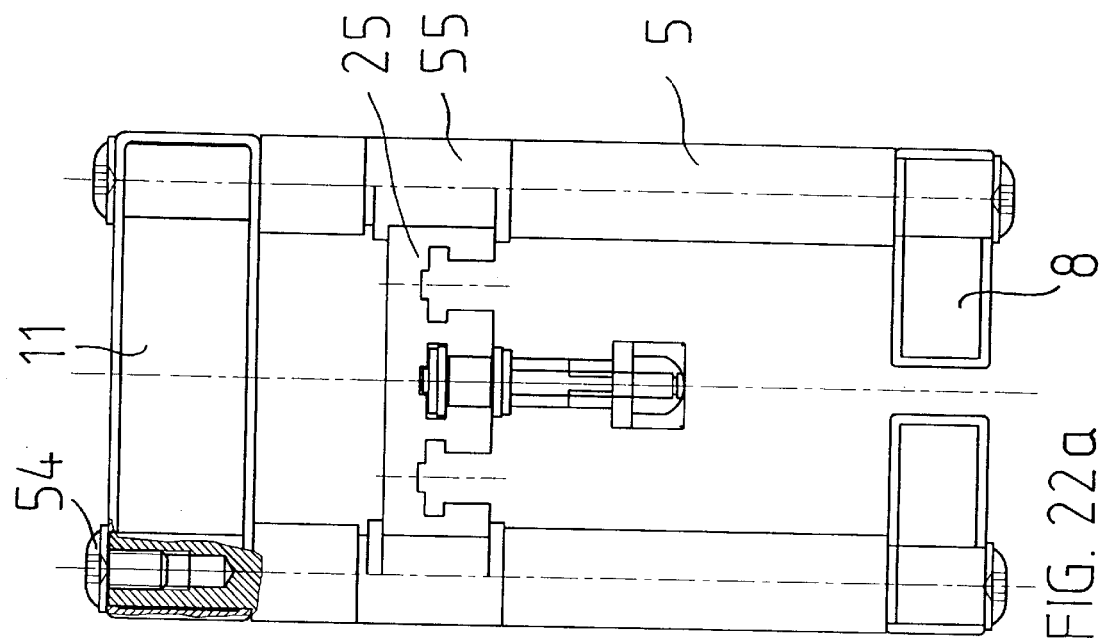
Figure 23:
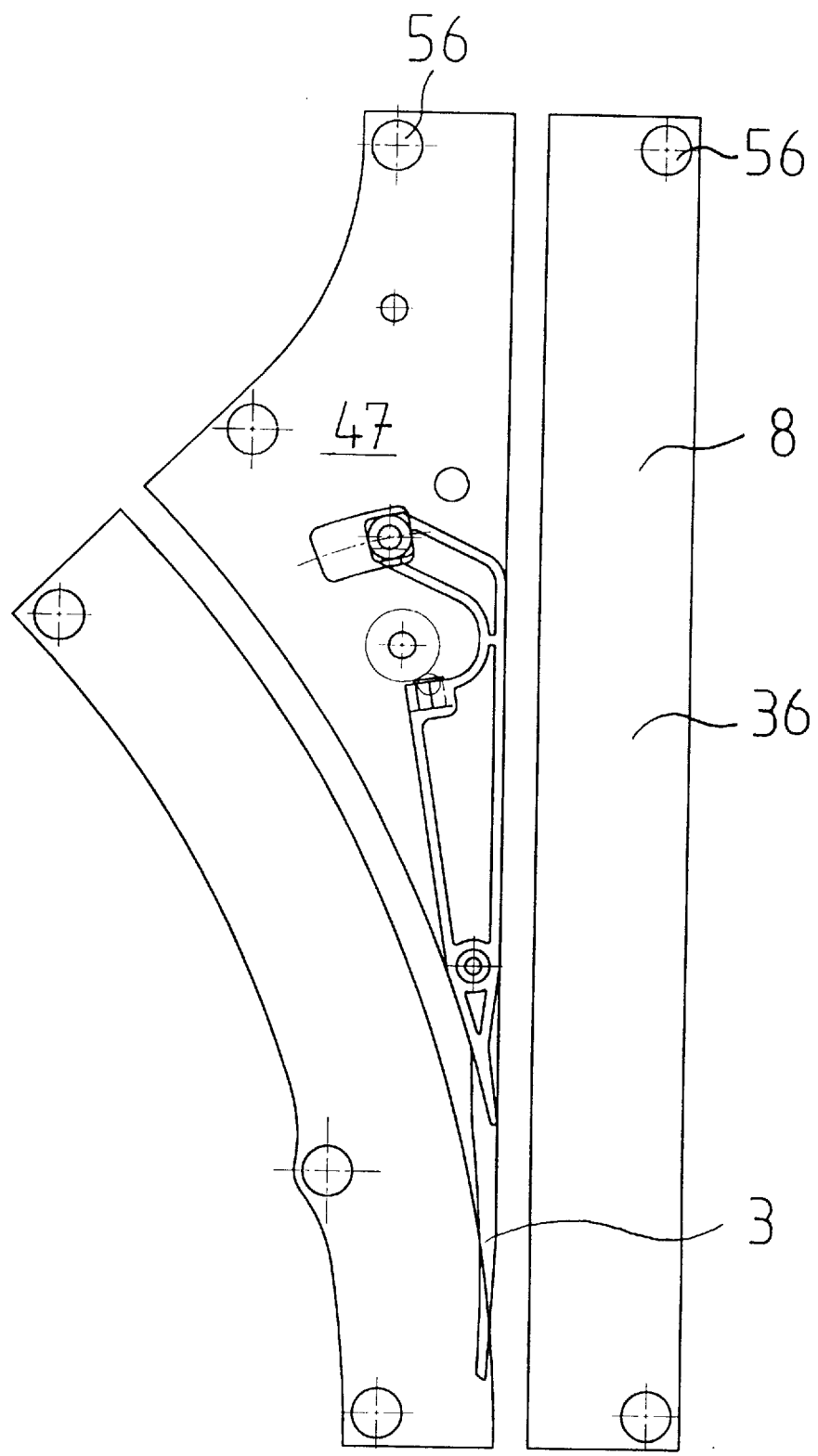
Figure 24:
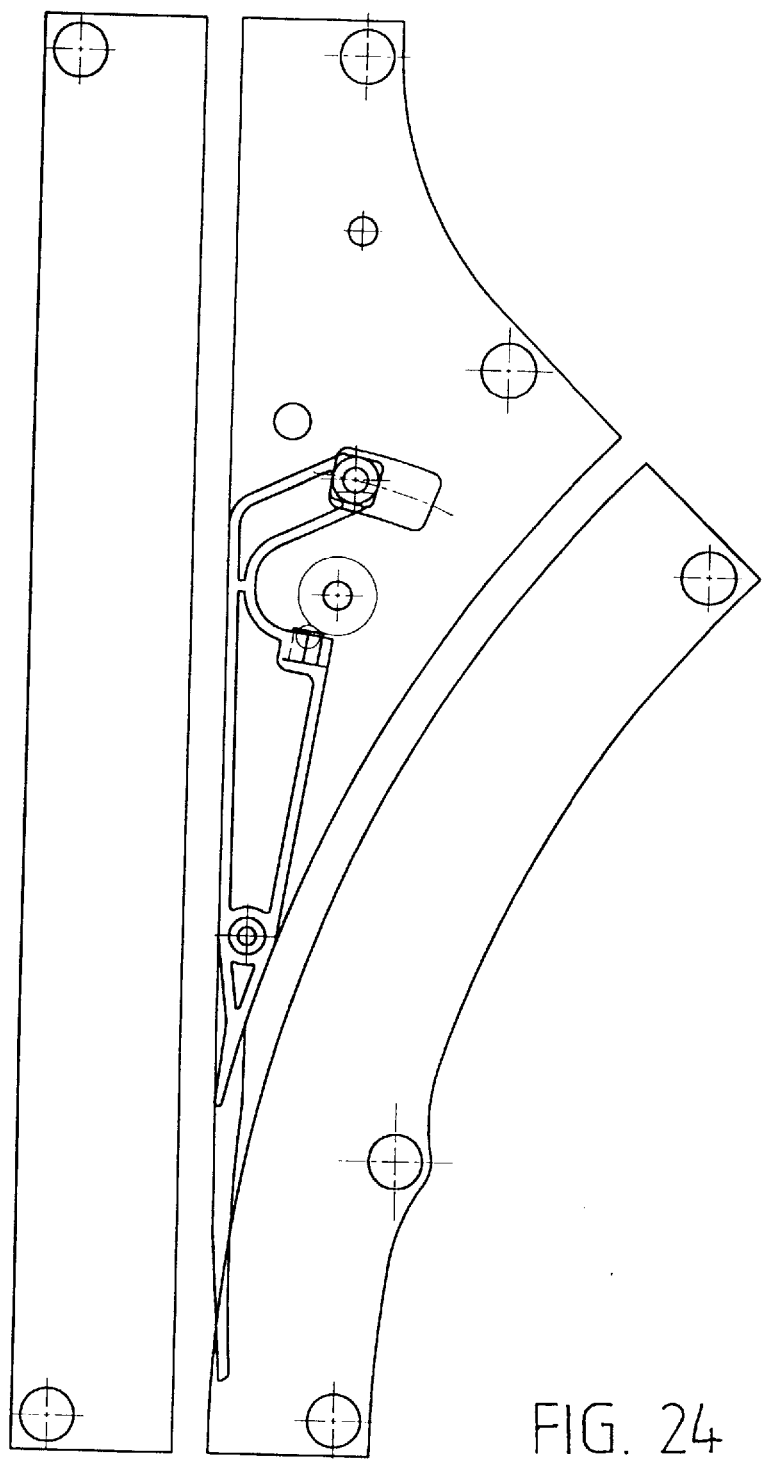
Figure 25:
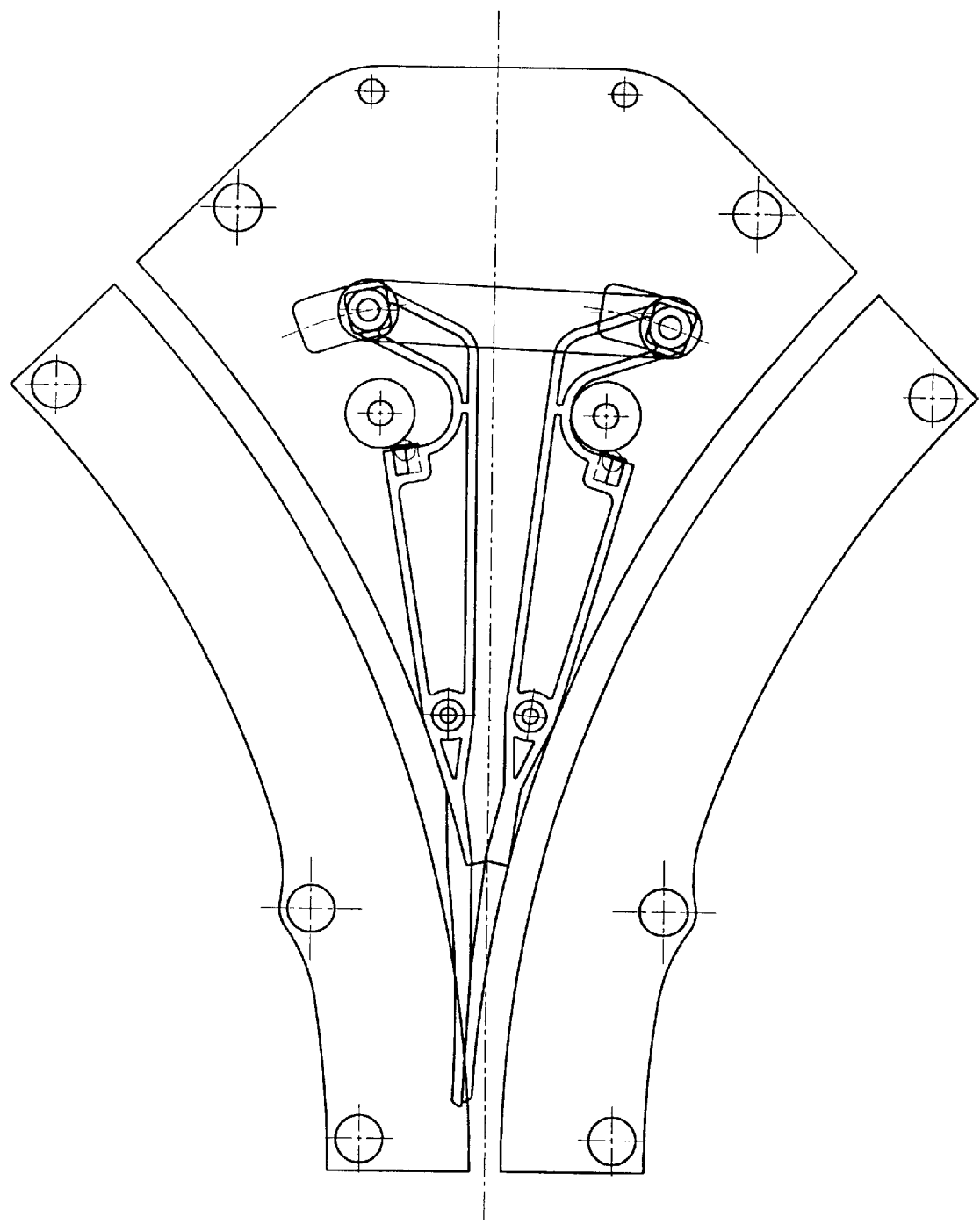
Figure 26:
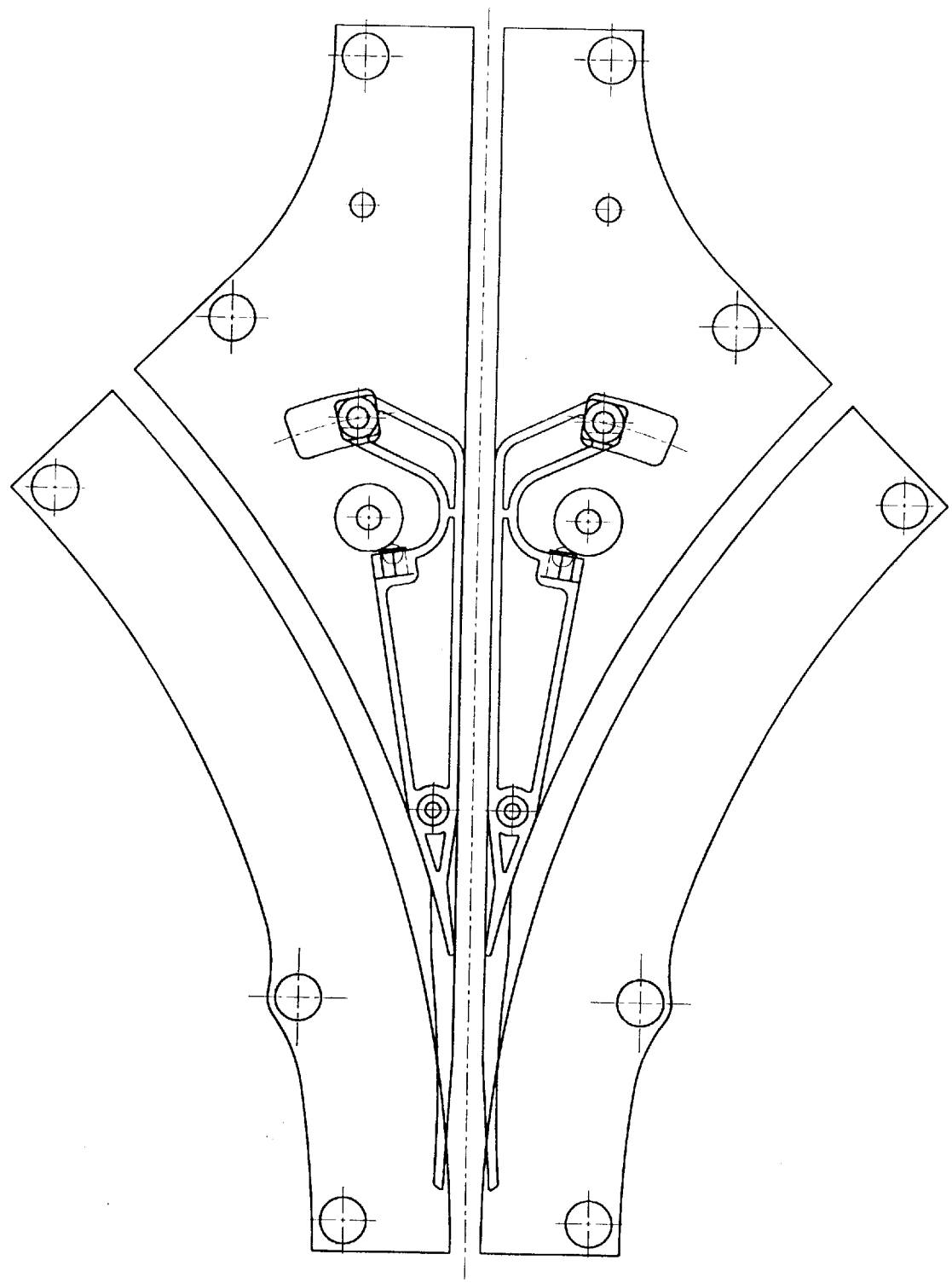

FIG. 4a) is a perspective schematic view of a rail portion;

FIG. 4b) is a sectional view along line A-B in FIG. 4c);

FIG. 4c) is a side elevational view of the rail portion shown in FIG. 4b) along with roller apparatuses shown in a side view;

FIGS. 5a) and 5b) are sectional views corresponding to FIG. 4b), wherein the embodiment shown comprises automatic driver members;

FIG. 6 shows a connecting joint between rail segments, with two bridges screwed to each other;

FIG. 7a) shows a sectional view corresponding to FIG. 4b), along with an additional schematic view of the switch blades;

FIG. 7b) is a side view of a roller apparatus comprising the lateral guide rollers;

FIG. 7c) is a schematic representation of the switch blades and the roller apparatus comprising the lateral guide rollers;

FIGS. 8a) and 8b) are sectional views corresponding to FIG. 4b), where the sectional support girders vary in size;

FIGS. 9 and 10 are sectional views corresponding to FIG. 4b) of another embodiment, where the sectional support girders vary in height;

FIG. 11 is a representation—corresponding to FIGS. 9 and 10—of another embodiment suitable for operation with an interior roller and automatic driver members;

FIG. 12 is a plan view of a straight segment of the rail system;

FIG. 13 is a plan view of an arcuate segment of the rail system;

FIG. 14 is a plan view of an intersection switch of the rail system;

FIG. 15 is a plan view of a 2-way switch straight/45° to the left;

FIG. 16 is a plan view of a 2-way switch straight/45° to the right;

FIG. 17 is a plan view of a double switch 45° to the right/45° to the left;

FIG. 18 is a plan view of a 3-way switch straight/45° to the right/45° to the left;

FIGS. 19a) and 19b) show front and side elevational views, respectively, of the roller apparatus;

FIGS. 20a) and 20b) show end views of further embodiments of the rail in the form of welded constructions;

FIGS. 21a) and 21b) show end views of still further embodiments of the rail in the form of welded constructions;

FIGS. 22a) and 22b) show end views of still further embodiments of the rail in the form of screwed constructions;

FIG. 23 is a plan view of a 2-way switch straight/45° to the left;

FIG. 24 is a plan view of a 2-way switch straight/45° to the right;

FIG. 25 is a plan view of a double switch 45° to the right/45° to the left;

FIG. 26 is a plan view of a 3-way switch straight/45° to the right/45° to the left.

Figure 1:
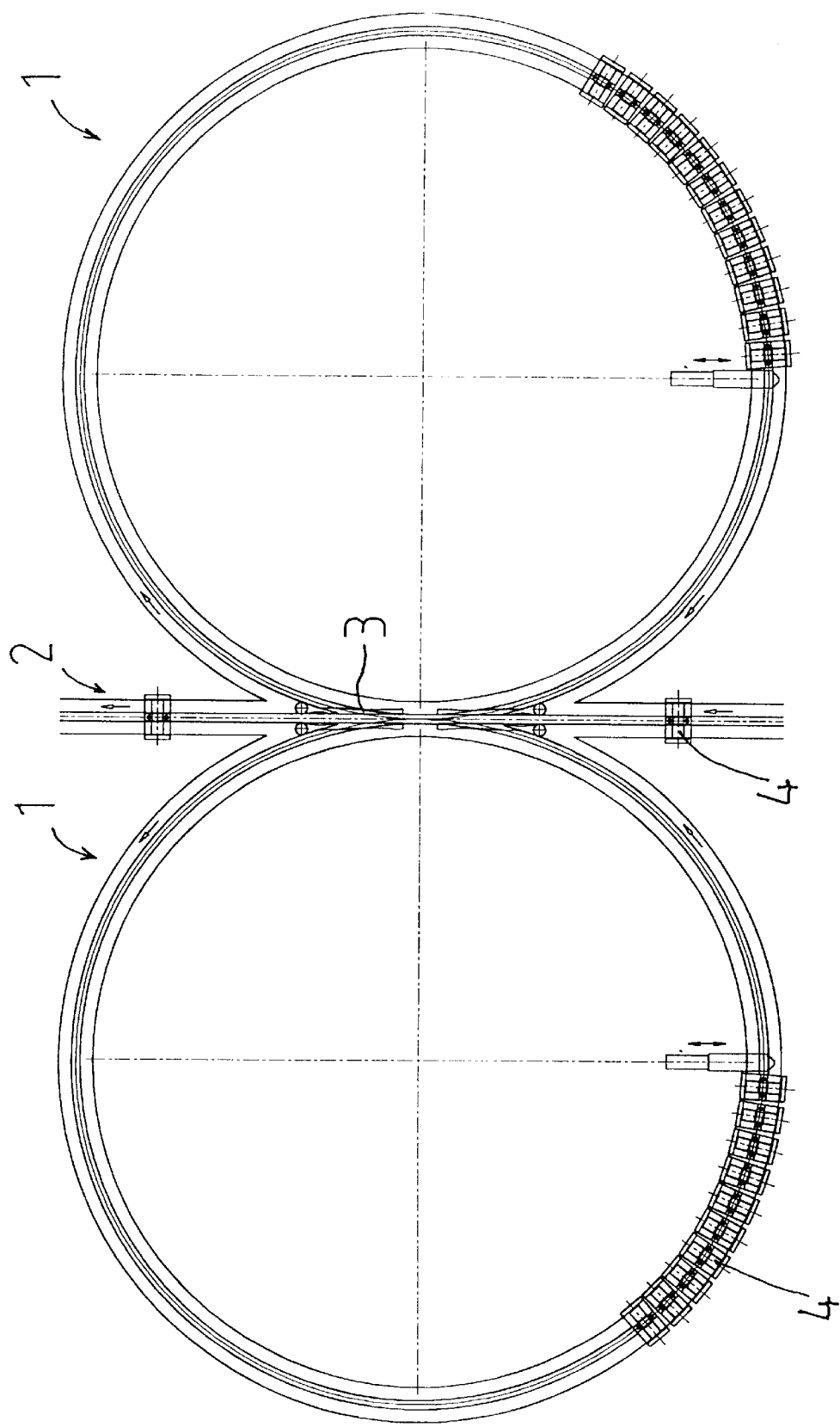

FIG. 1 is a schematic plan view representation of part of a rail network in which two circulating loops 1 are connected to a straight path 2; switch blades 3 can be shifted in order to introduce roller apparatuses 4 (also schematically represented) from the straight path 2 into the loops 1 or to revert the roller apparatuses 4 from the loops 1 to the straight path 2. As can be clearly seen in the drawing figure, two 3-way switches are provided for this purpose, each 3-way switch allowing straight travel and a diversion to the left or a diversion to the right, or straight travel or travel onto the straight path 2 from the left or from the right.

Figure 2:
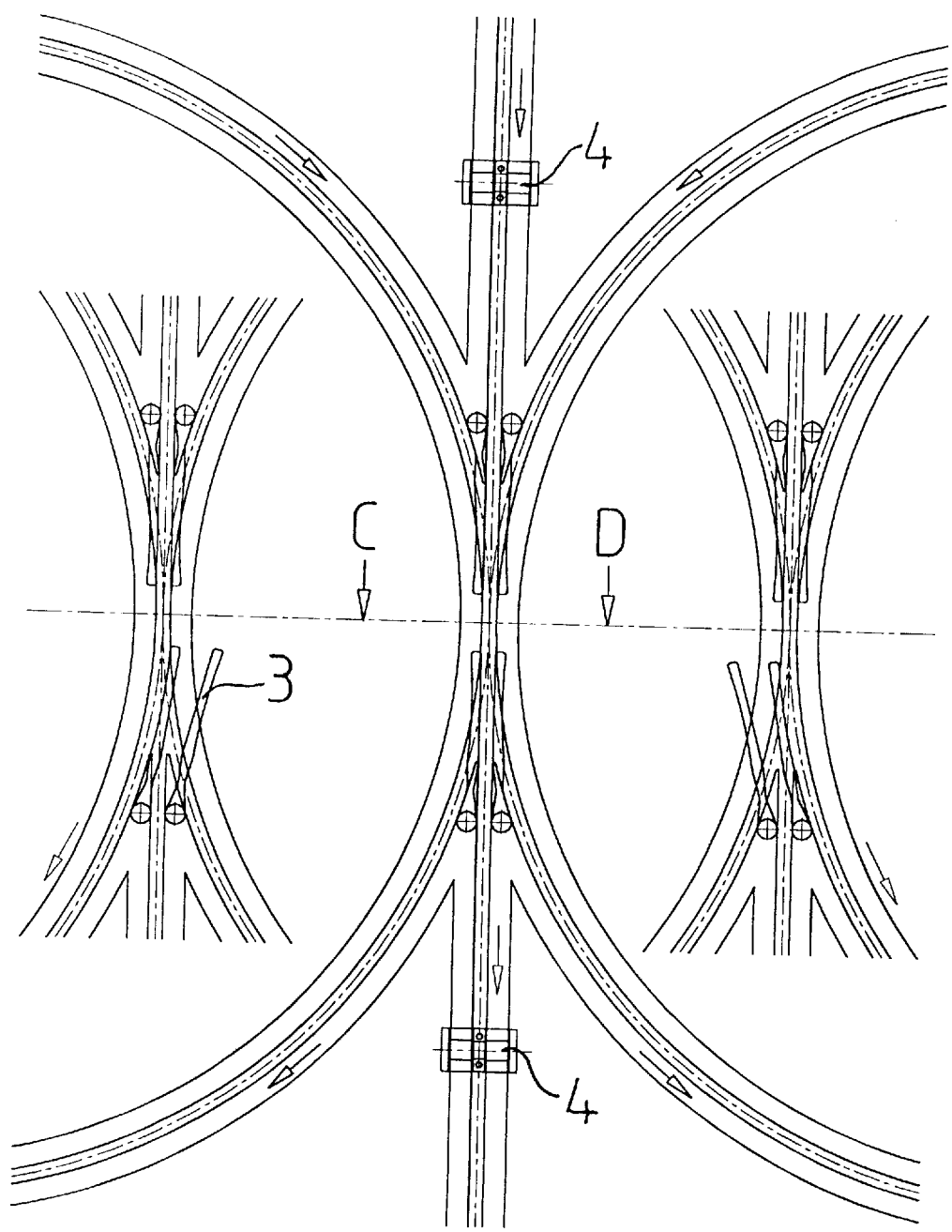
FIG. 2 is a schematic plan view of various switch positions in the rail network part shown in FIG. 1.

FIG. 2 is a schematic representation of the rails with the associated switch blades 3 shown in three different positions. The switch blades 3 are pivoted individually or in pairs with respect to the rails such as to be substantially parallel to each other at any time.

FIG. 3 is also a schematic illustration of a 2-way switch allowing straight travel and a diversion to the left. The roller apparatus 4 is likewise shown in a schematic plan view, the roller apparatus 4 being equipped with bearing rollers 5 and lateral guide rollers 6, with the latter guided in a guide slit 7. The sectional running girders 8 are provided with upper running surfaces 9 along which the bearing rollers 5 roll. The lateral guide rollers 6 are directed by the position of the switch blade 3 or switch blades 3, respectively, such as to allow straight travel or a diversion accordingly.

FIG. 4 schematically illustrates the structure of the rails, with FIG. 4a) showing a schematic perspective view of a rail portion comprised of two path segments 10 in the embodiment shown. FIG. 4a) illustrates the two sectional running girders 8 and two sectional support girders 11 joined to each other by bridge parts 12. The path segments 10 adjacent to each other are interconnected through the bridges 12, as will be explained in greater detail below. At the same time, the bridges 12 hold the sectional running girders 8 at a defined distance from each other such that the guide slit 7 has a defined width to receive the lateral guide rollers 6 therein with the required play. Further, the sectional support girders 11 are held at a predetermined distance from each other by the bridges 12 such as to define a mounting slot 13 between the sectional support girders 11, through which mounting slot 13 clamp screws 14 can be fitted. The heads of the clamp screws 14 are seated in an undercut groove on top of the bridge 12; the clamp screws 14 press the sectional support girders 11 against the bridges 12 by means of respective upper clamping plates 16; the bridges 12 are each formed as a portion of a sectional structure 15, as shown in FIG. 4b).

In contrast to the illustration in FIG. 4a), the sectional support girders 11 according to the representations shown in FIGS. 4b) and 4c) are not identical to the sectional running girders 8 but have a higher cross-section in order to achieve a greater flexural resistance.

FIG. 4c) is a side elevational view of a rail segment portion or rail portion 10 clearly showing the bridges 12, the clamping plates 16, the sectional support girders 11, the sectional running girders 8 and the roller apparatuses 4. The roller apparatuses 4 each comprise a lower hook 17, which may be used to receive coat hangers, for example, as well as the abovementioned bearing rollers 5 and the lower stabilizing rollers 18 engaging a lower running surface 19 of the sectional running girders 8 whereas the bearing rollers 5 are supported by the upper running surface 9 of the sectional running girders 8. The roller apparatuses 4 are provided with respective drive-receiving projections 20 allowing the roller apparatuses 4 to be entrained automatically.

FIGS. 5a) and 5b) show sectional views along line A-B in FIG. 4 and, thus, sectional views corresponding to FIG. 4b). Again, the sectional support girders 11 are pressed against the sectional structure 15 by means of clamp screws 14 with the help of clamping plate 16. The sectional running girders 8 are engaged from below, or supported, by flanges 21; the upper faces of the sectional running girders 8 bear on lateral shoulders of the sectional structure 15 and are in addition firmly connected to the sectional structure 15 by means of screws 22. Alternatively, appropriate rivets, for example, may be used instead of screws 22. Further, there are shown driver members 23 adapted to engage the drive-receiving projection 20. The driver members 23 are connected to a chain 24 which may circulate in a plastic rail 25. In this arrangement, the loose side of the chain carrying the driver members moves in a chamber 27 provided in the sectional structure 15 into which the plastic rail 25 has been pressed for this purpose. To receive the plastic rail 25, the sectional structure 15 may be provided with corresponding projections 33 integral with the sectional structure 15.

Figure 5B:
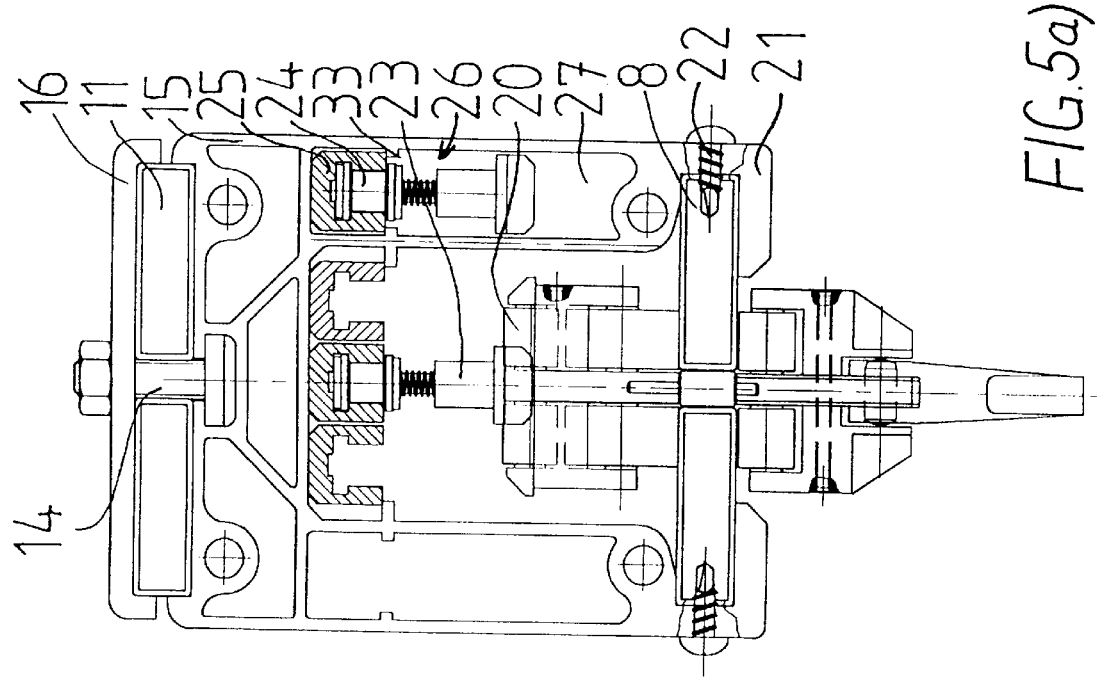

As shown in FIG. 5b), up to three driver members may be arranged side by side in the sectional structure 15, which may be necessary, for example, in order to prevent driver members from colliding in path portions such as designated by sectional line C-D in FIG. 2. Depending on the desired travelling direction downstream of such a path segment—i.e. straight forward, diversion to the left or diversion to the right, as determined by the switch blades 3, the two driver members no longer required downstream of the switch disengage the drive-receiving projection 20, resulting again in the arrangement shown in FIG. 5a), for example.

As mentioned above, the sectional running girders 8 are provided with upper running surfaces 9 and lower running surfaces 19, with the bearing rollers 5 engaging the upper running surfaces 9 and the stabilizing rollers 18 engaging the lower running surfaces 19. The sectional structure 15 serves to hold the sectional running girders 8 at a defined distance from each other, thus forming the guide slit 7 in which the lateral guide rollers 6 are received and guided.

Further, there are clearly shown fixing or connecting bores 28 provided in the sectional structure 15 and extending parallel to the sectional running and supporting girders. These fixing or connecting bores 28 allow several bridges 12 to be connected to one another or to any other segment, as shown in FIG. 6. To this end, the bridge parts 12 may be joined to one another by conventional connection screws 29.

FIGS. 7a) to 7c) illustrate another embodiment in which the sectional structure 15 has a lower structure in a rail portion designed for manual operation than in a rail portion designed for automatic operation. In other words, the sectional support girders 11 and the sectional running girders 8 are arranged closer together because no structural space is required for the driver chains. FIG. 7b) is another, enlarged illustration of the roller apparatus 4, while FIG. 7c) is a schematic plan view of the sectional running girders 8. As shown in FIGS. 7b) and 7c), two lateral guide rollers 6 are provided at a distance from each other in the direction of travel of the roller apparatus 4. Provision of two lateral guide rollers 6 ensures enhanced stability of operation and improved guidance. The switch blades 3 are disposed within the sectional running girders 8 and are pivotable therein accordingly. On the one hand, this arrangement allows the switch blades 3 to engage the lateral guide rollers 6 directly in the guide slit 7; at the same time, the switch blades 3 can be accommodated in a compact and protected fashion, and are not stressed by the weight of the roller apparatus and the load suspended therefrom.

Figure 19B:
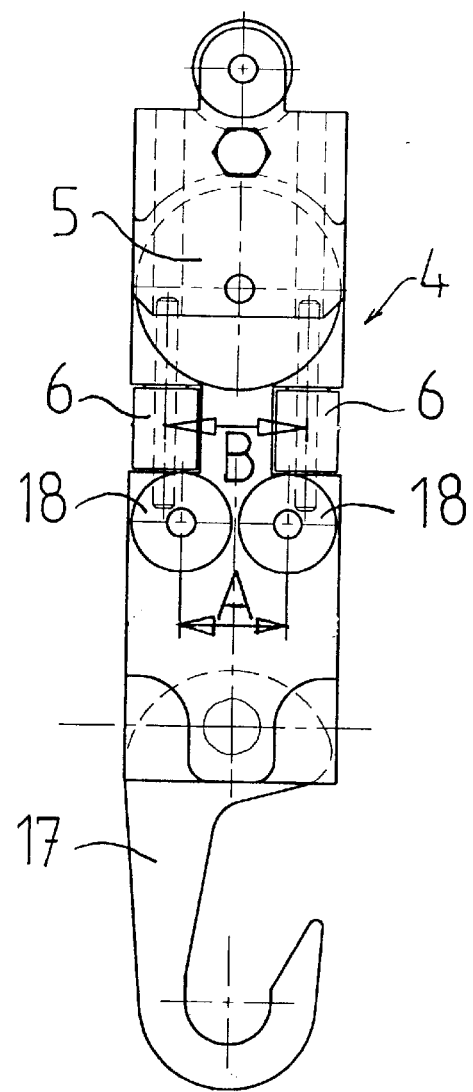

In FIGS. 19a) and 19b), the roller apparatus is illustrated in greater detail, with corresponding parts designated by the same reference numerals as in FIGS. 7a) to 7c). FIG. 19a) is a front view of the roller apparatus as seen against its direction of travel, while FIG. 19b) is a side elevational view of the roller apparatus, i.e. as seen transversely to its travelling direction. As shown in FIG. 19b), the distance A between the axes of the two pairs of stabilizing rollers 18 is smaller than the distance B between the two lateral guide rollers 6.

According to the embodiment shown, the drive-receiving projections 20 are arranged as drive-receiving rollers. According to other embodiments, such as shown in FIG. 5, for example, the drive-receiving projections 20 may be provided in the form of simple noses.

The roller apparatus 4 depicted in FIGS. 19a) and 19b) is arranged to be symmetric with respect to its vertical transverse median plane. In its front view, the carriage of the symmetric roller apparatus 4 is substantially H-shaped, with the H-bridge penetrating the guide slit 7 arranged between, and separating, two sectional running girders 8 of the running rail. Accordingly, the bearing roller 5 and each stabilizing roller 18 are divided into two rollers sharing a common axis.

A load hook 17 is hinged to the lower end of the roller apparatus 4 by means of a load-hook pivot pin 51 such as to permit pivoting of the load hook 17 about the pivot pin 51. This feature achieves a further stabilization because the load hook 17 can yield and, thus, does not transfer forces to the roller apparatus with a long leverage.

While being individually and freely displaceable along the rail, the roller apparatus as described with reference to FIGS. 19a) and 19b) achieves the effect that it has only one degree of freedom, i.e. it is displaceable only along the rail. Due to this arrangement, external forces—e.g. produced when the roller apparatus is coupled to, or uncoupled from, an automatic driver member—can be applied to, and received by, the individual roller apparatus without causing the roller apparatus to lose its position stability.

Further embodiments are shown in FIG. 8 which in particular illustrates that different sectional support girders 11 may be used, depending on the desired flexural resistance, while employing the same sectional structure 15.

Moreover, FIG. 8b) shows that in contrast to the preceding embodiments, it is not necessary for the sectional running girders 8 to be screwed laterally to the sectional structure 15; rather, the screws 22 may be alternatively inserted through the flange 21 and through the associated sectional running girder 8 to be screwed into the sectional structure 15. Of course, rivets instead of the screws 22 may be used again also in this case. It is also possible for the sectional running girders to be fixed to the sectional structure 15 by sticking or welding.

According to the embodiments shown in FIGS. 9 and 10, the clamping plate 16 of the preceding embodiments is dispensed with; instead, the sectional support girder 11 is simply clamped to the sectional structure 15 by means of the clamp screws 14 and washers 30. In addition, upper vertical flanges 31 may be provided to accommodate the sectional support girders 11 in a reliable manner. As indicated by chain-dotted lines 32, the sectional support girders may be additionally riveted or screwed to the sectional structure 15 through the flanges 31 by means of rivets or screws, respectively. In the embodiment according to FIG. 9, the sectional support girders 11 are flush with the flanges 31, resulting in a particularly protected arrangement and visually aesthetic design. As suggested by the low structural height of the sectional structures shown in FIGS. 9 and 10, these embodiments are designed for manual operation because automatic driver members cannot be accommodated within the sectional structure 15.

FIG. 11 illustrates an embodiment corresponding to FIG. 9 but suitable for automatic operation, as opposed to the FIG. 9 embodiment. It will be appreciated that the constructions according to FIGS. 9 and 11 are generally identical except for the sectional structure 15 which is both higher and wider in the FIG. 11 embodiment, in order to be able to accommodate the driver members and the loose side of the driver chain. The chambers 27 are provided for the loose side of the driver chain. Further projections similar to projection 33 may be provided to fix other components, such as hydraulic tubes or cable channels, to the bridge 12.

FIGS. 12 through 18 illustrate various rail segments of which the whole rail system is made up in a modular manner. In principle, no more types of rail segments are required to implement any rail network. Like components are designated by like reference numerals throughout FIGS. 12 to 18 as well as in the other drawing figures.

FIG. 12 is a plan view of a straight path segment 10. A perspective view of this type of path segment has already been shown in FIG. 4a). FIG. 12 depicts the sectional support girders 11, below which the sectional running girders 8 are congruently arranged, with the sectional support girders 11 and sectional running girders 8 held together by the bridges 12 disposed at both ends of the rail segment 10. At the same time, the bridges 12 provided with the mounting strips serve to connect the rail segment to other rail segments, as mentioned above.

FIG. 13 shows a corresponding arcuate segment wherein the angle of the centre line 34 of the guide slit 7 is 45° between the entry end of the arcuate segment and its exit end. In order to realise a small tolerance regarding the arc radius and the entry/exit angle of the arcuate segment, the sectional support and running girders may be designed as moulded plastic pieces such as full-sectional girders.

FIG. 14 shows an intersection switch wherein four intersection switch angles 35 are joined to each other by means of bridges 12. The guide slits 7 intersect at an angle of 90°.

FIGS. 15 and 16 show 2-way switches allowing straight travel and a diversion through 45° to the left or to the right, respectively. For the sake of illustration, the switch blades 3 have been hatched. The switch blades 3 are pivotably hinged by bearing pins 36 and extend rearwardly. The rear end 37 of the switch blade 3 is provided with a recess 38 in which an elbow lever 39 can be received which in turn is pivotable about a bearing pin 40. An automatic control means can engage the end 41 remote from the switch blade 3 in order to pivot the elbow lever 39 and the switch blade 3 by means of the recess 38. In addition, a further rear end 42 of the switch blade 3 is guided by a guide pin 43 in an oblong hole 44. The guide pin 43 may be connected to a lever for manual operation to be able to shift the switch mechanism selectively by hand or automatically. A spring-biased detent ball 45 housed in the switch blade 3 may be caught in a catch lock 46 or rotating element in order to hold the switch blade 3 releasably but in defined positions.

FIG. 16 shows a switch similar to that shown in FIG. 15 but allowing a diversion to the right as well as straight forward travel. It is also possible to use a switch shown in FIG. 15 as a switch shown in FIG. 16, i.e. for straight forward travel and a diversion to the right. To this end, it is only necessary to release the bridges 12 and to invert the switch tongue 47. In addition, the manual lever (not shown) connected to the guide pin 43 has to be refitted so that it can be operated from below. Although the conversion of a switch as shown in FIG. 15 to a switch as shown in FIG. 16 requires some assembly effort, this process nevertheless represents an inexpensive variation option further increasing the flexibility of the modular system.

FIG. 17 shows a switch allowing a diversion either to the left or to the right only. The shape of the switch blade 3 is redesigned accordingly. The slot 48 does not constitute a guide slit but results only as a matter of necessity from the fact that the double switch shown in FIG. 17 is made up of the same switch tongues 47 as those shown in FIGS. 15 and 16. Thus, the end 49 of the switch shown in FIG. 17 is a blind end.

Finally, FIG. 18 shows a 3-way switch allowing straight forward travel, a diversion to the left through 45° and a diversion to the right through 45°. As can be seen in the Figure, two switch blades 3 are required which have to be moved synchronously to some extent in order to set the switch to its respective desired positions.

As can be seen in FIGS. 12 to 18, the rail segments are always provided with respective bridges 12 at the ends of the running rails, said bridges 12 holding the sectional support girders and the sectional running girders together and interconnecting adjoining rail segments.

End views of another, particularly inexpensive embodiment of a straight or arcuate segment or an intersection switch of the rail are shown in FIGS. 20a) and 20b). This sectional profile is designed to be low for manual operation, only a single sectional support girder 11 is provided which is connected to the two sectional running girders 8 through strips 52 welded both to the sectional support girder 11 and the sectional running girders 8. According to the embodiment shown in FIG. 20b), the strips arranged at the respective ends of the rail segments are additionally provided with connection through-holes 53 allowing the rail segment to be connected to an adjacent rail segment. The welding construction according to FIGS. 20a and 20bconstitutes a particularly economical solution, where care has to be taken only to prevent welding deformations causing the width of guide slit 7 to vary excessively.

Figure 20B:
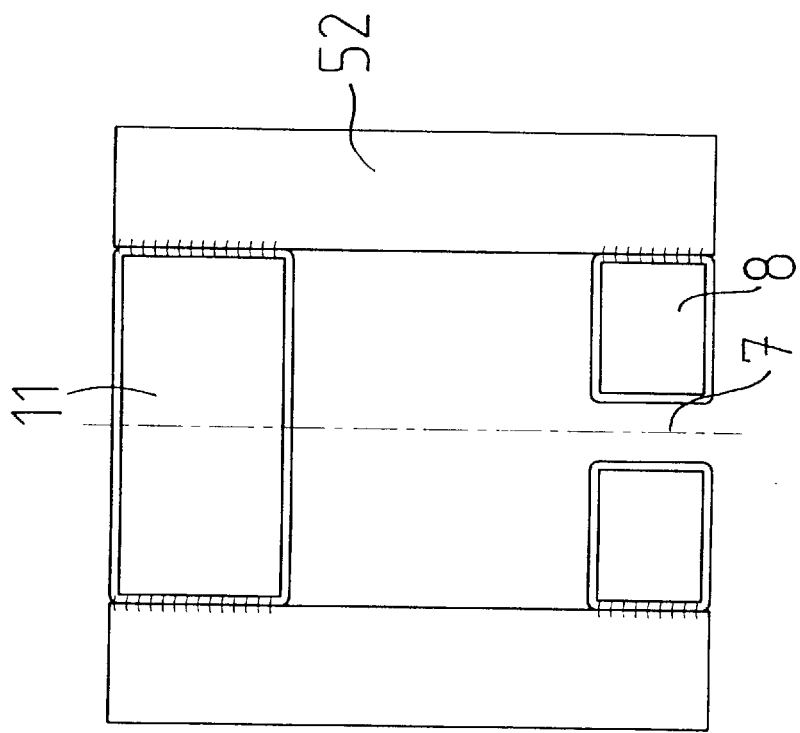

FIGS. 21a and 21b show views corresponding to those shown in FIGS. 20a and 20b, except that the longer strips 52 leave sufficient space for an automatic driver member 23 guided in the plastic rail 25 between the sectional support girder 11 and the sectional running girders 8. In addition, a further connection through-hole 53 is provided resulting in each strip 52 comprising two connection through-holes 53.

FIGS. 22a and 22b show a construction corresponding to that shown in FIGS. 21a and 21b, except that the strips 52 are designed in the form of round metal rods screwed to the sectional support girder 11 and to the sectional running girders 8 by means of screws 54. Similarly, connection through-holes 53 may be provided as shown in FIG. 22b. Moreover, fixing devices 55 made of plastics material may be snapped onto the rods to carry the plastic rails 25. Alternatively, the construction according to FIGS. 22a and 22b may be provided with shorter mounting strips and may lack drivers, for manual operation, in analogy of the embodiments illustrated in FIGS. 20a and 20b.

Examples of further embodiments of various switches are shown in FIGS. 23 to 26; regarding their description, reference is essentially made to the description relating to FIGS. 15 to 18. As in FIGS. 15 to 18, lower parts of the respective switches are illustrated in plan views. A substantial difference from the embodiments shown in FIGS. 15 to 18 is that no elbow lever 39 is used in the embodiments according to FIGS. 23 to 26; for this reason, the switch blades 3 can be operated directly by means of the respective operating levers connected thereto, in order to be pivotable about the respective bearing pins 36.

The switch tongues 47 and the sectional running girders 8 according to the embodiments illustrated in FIGS. 23 to 26 are screwed to column rods (not shown) through bores 56, and the column rods are in turn screwed to plates or pairs of plates parallel to each other (not shown, either), thus holding the entire switch segments together; the plates or pairs of plates parallel to each other, respectively, replace the sectional support girders.

We claim:

1. Suspension conveyor system comprising a rail network composed of a plurality of rails, the suspension conveyor system further comprising a roller apparatus adapted to travel along the rail network, wherein the rails comprise at least two sectional running girders (8) each provided with an upper running surface (9) and a lower running surface (19);

the sectional running girders (8) extend side by side and are interconnected through strips spaced from each other such as to form a guide slit (7) having a defined width between the two sectional running girders (8);

the roller apparatus (4) has a carriage comprising two bearing rollers (5) supported by the upper running surfaces (9) of the sectional running girders (8), the bearing rollers (5) having a common travelling axis;

the lower end of the roller apparatus (4) is equipped with a load carrying means, arranged below the guide slit (7);

the roller apparatus has only one travelling axis;

at least two stabilizing rollers (18), below the bearing rollers, are arranged at a distance from each other in the travelling direction of the roller apparatus, behind and in front of the travelling axis of the bearing rollers (5), respectively, the stabilizing rollers (18) being arranged to engage from below the lower running surfaces (19) of the sectional running girders (8), the axis of the stabilizing rollers (18) extending parallel to the axis of the bearing rollers (5);

the roller apparatus (4) comprises two lateral guide rollers (6) spaced from each other in the travelling direction of the roller apparatus (4), the axis of the lateral guide rollers (6) extending perpendicular to the axis of the bearing rollers (5), and the lateral guide rollers (6) are arranged between the bearing rollers (5) and the stabilizing rollers (18) such that the lateral guide rollers (6) are guided in the guide slit (7);

the rails comprise at least one sectional support girder (11);

the sectional running girders (8) have a rectangular cross-section;

the sectional running girders (8) extending side by side and the sectional support girders (11) are interconnected through strips spaced from each other;

the roller apparatus is conveyed automatically by means of a driver member (23) engaging the roller apparatus;

switches are provided to direct the roller apparatus (4) to straight forward travel, a diversion to the left or a diversion to the right, depending on the switch position, and the lateral guide rollers (6) are disposed between the bearing rollers (5) and the stabilizing rollers (18) such as to cooperate with the switches.

2. Suspension conveyor system according to claim 1, characterized in that a driven conveyor means is provided extending along the sectional running girders (8) of the rail network and comprises said driver members (23) that can be coupled to drive-receiving projections (20) arranged on top of the carriage of each roller apparatus (4).

3. Suspension conveyor system according to claim 1, characterized in that the bearing rollers (5) and the stabilizing rollers (18) are arranged completely within the outline of the carriage (4).

4. Suspension conveyor system according to claim 1, characterized in that switch blades (3) are provided to engage the lateral guide rollers (6) in the guide slit (7) and to direct the roller apparatus (4) to straight forward travel, a diversion to the left or a diversion to the right, depending on the switch position.

5. Suspension conveyor system according to claim 4, characterized in that said switch blades (3) extend parallel to each other and are disposed on both sides of the guide slit (7), said switch blades (3) being accommodated in the respective sectional running girders (8).

6. Suspension conveyor system according to claim 1, characterized in that the sectional support girders (11) are tubes of square or rectangular cross-section, the exterior surfaces of the tubes being oriented horizontally and vertically, respectively.

7. Suspension conveyor system according to claim 6, characterized in that the cross-section of the sectional support girders (11) is higher than that of the sectional running girders (8).

8. Suspension conveyor system according to claim 1, characterized in that the rail network is composed of separate arcuate segments, straight segments and switch segments in a modular manner, and the strips are arranged at least at the ends of the rail segments, the rail segments being interconnected through the strips arranged at the ends thereof.

9. Suspension conveyor system according to claim 8, characterized in that the rail network is essentially composed of the following types of rail segments: arcuate segment, straight segment, 2-way switch straight/45° to the left, 2-way switch straight/45° to the right, 2-way switch 45° to the right/45° to the left, 3-way switch straight/45° to the right/45° to the left, and intersection switch.

10. Suspension conveyor system according to claim 9, characterized in that the switches each comprise a tongue (47) and an associated switch blade (3) or associated switch blades (3), respectively, wherein the associated switch blade (3) or associated switch blades (3) are pivotably hinged to the tongue.

11. Suspension conveyor system according to claim 10, characterized in that the 2-way switch straight/45° to the left is axially symmetric to the 2-way switch straight/45° to the right, and the switch tongue (47) is arranged such that it can be inverted to be used selectively for a 2-way switch straight/45° to the left or a 2-way switch straight/45° to the right.

12. Suspension conveyor system according to claim 1, characterized in that the diameter of the bearing rollers (5) is greater than the diameter of the stabilizing rollers (18).

13. Suspension conveyor system according to claim 1, characterized in that the load-carrying means is a load hook (17) pivotably hinged to the carriage.

14. Suspension conveyor system according to claim 1, characterized in that the axes of the bearing rollers (5) are integral with each other, and the axes of the stabilizing rollers (18) are integral with each other, both types of axes being supported at three points of the carriage of the roller apparatus (4).

15. Suspension conveyor system according to claim 1, characterizing in that the distance between the axes of the lateral guide rollers (6) is greater than the distance between the axes of the stabilizing rollers (18).

16. Suspension conveyor system according to claim 1, characterized in that the load carrying means is a load hook (17).

* * * * *